US009009810B2

(12) United States Patent
Grigoriev et al.

(10) Patent No.: US 9,009,810 B2
(45) Date of Patent: Apr. 14, 2015

(54) METHOD AND APPARATUS FOR PROVIDING REACTIVE AUTHORIZATION

(75) Inventors: Nikolai Grigoriev, Brossard (CA); Sylvain Fortin, St-Laurent (CA); Halli Thorkelsson, Kopavogur (IS)

(73) Assignee: Nokia Corporation, Espoo (FI)

( * ) Notice: Subject to any disclaimer, the term of this patent is extended or adjusted under 35 U.S.C. 154(b) by 718 days.

(21) Appl. No.: 12/790,358

(22) Filed: May 28, 2010

(65) Prior Publication Data

US 2011/0296517 A1    Dec. 1, 2011

(51) Int. Cl.
*G06F 9/00* (2006.01)
*H04L 29/06* (2006.01)

(52) U.S. Cl.
CPC .................... *H04L 63/102* (2013.01)

(58) Field of Classification Search
CPC .................................................. H04L 63/0884
USPC .......................................................... 726/12
See application file for complete search history.

(56) References Cited

U.S. PATENT DOCUMENTS

| 6,842,906 | B1 * | 1/2005 | Bowman-Amuah ......... 719/330 |
| 7,035,846 | B2 | 4/2006 | Gupta et al. |
| 7,093,286 | B1 | 8/2006 | King |
| 7,293,281 | B1 * | 11/2007 | Moran et al. ...................... 726/3 |
| 7,703,127 | B2 | 4/2010 | Moran et al. |
| 2002/0046352 | A1 * | 4/2002 | Ludwig ......................... 713/201 |
| 2006/0168122 | A1 * | 7/2006 | Acharya et al. ............... 709/219 |
| 2007/0124475 | A1 * | 5/2007 | Syed et al. .................... 709/226 |
| 2008/0249997 | A1 | 10/2008 | Sun et al. |

FOREIGN PATENT DOCUMENTS

WO    WO 2008150146 A    12/2008

OTHER PUBLICATIONS

A Notification of Transmittal of the International Search Report and the Written Opinion of the International Searching Authority to corresonding International Application No. PCT/FI2011/050432 dated Sep. 8, 2011.
Alferes, JJ et al. "Towards Reactive Semantic Web Policies: Advanced Agent Control for the Semantic Web" [online]. Poster and Demo Session of the 7th International Semantic Web conference (ISWC 2008), Karlsruhe, Germany, Oct. 2008, pp. 1-2.
International Search Report to corresponding International Application No. PCT/IF2011/050432 dated Sep. 8, 2011, pp. 1-5.
Karger, P et al. "Reactivity and Social Data: Keys to Drive to Decisions in Social Network Applications" [online]. In: Proceeding of the Second International ISWC Workshop on Social Data on the Web (SDoW2009), Washington, DC, USA, Oct. 25, 2009, pp. 1-15.
Written Opinion to corresponding International Application No. PCT/F2011/050432 dated Sep. 8, 2011, pp. 1-9.

(Continued)

*Primary Examiner* — Peter Shaw
(74) *Attorney, Agent, or Firm* — Ditthavong & Steiner, P.C.

(57) ABSTRACT

An approach is provided for providing reactive authorization for accessing a semantic network resource. An access application of a resource owner entity detects an authorization proxy entity acting between at least a semantic network resource and a requesting entity that requests access to the semantic network resource. The access application determines to cause, at least in part, actions that result in transmission of a query for whether to accept the requesting entity to an owner entity of the semantic network resource.

20 Claims, 15 Drawing Sheets

(56) References Cited

OTHER PUBLICATIONS

Client-Server Protocol Session and Transactions, v. 1.3, Open Mobile Alliance, OMA-TS-IMPS_CSP-V1_3-20070123-A, Jan. 23, 2007, pp. 1-206.

Office Action for corresponding Chinese Application No. 201180026421.6, dated Oct. 30, 2014, 8 pages (English Language Summary Included).

* cited by examiner

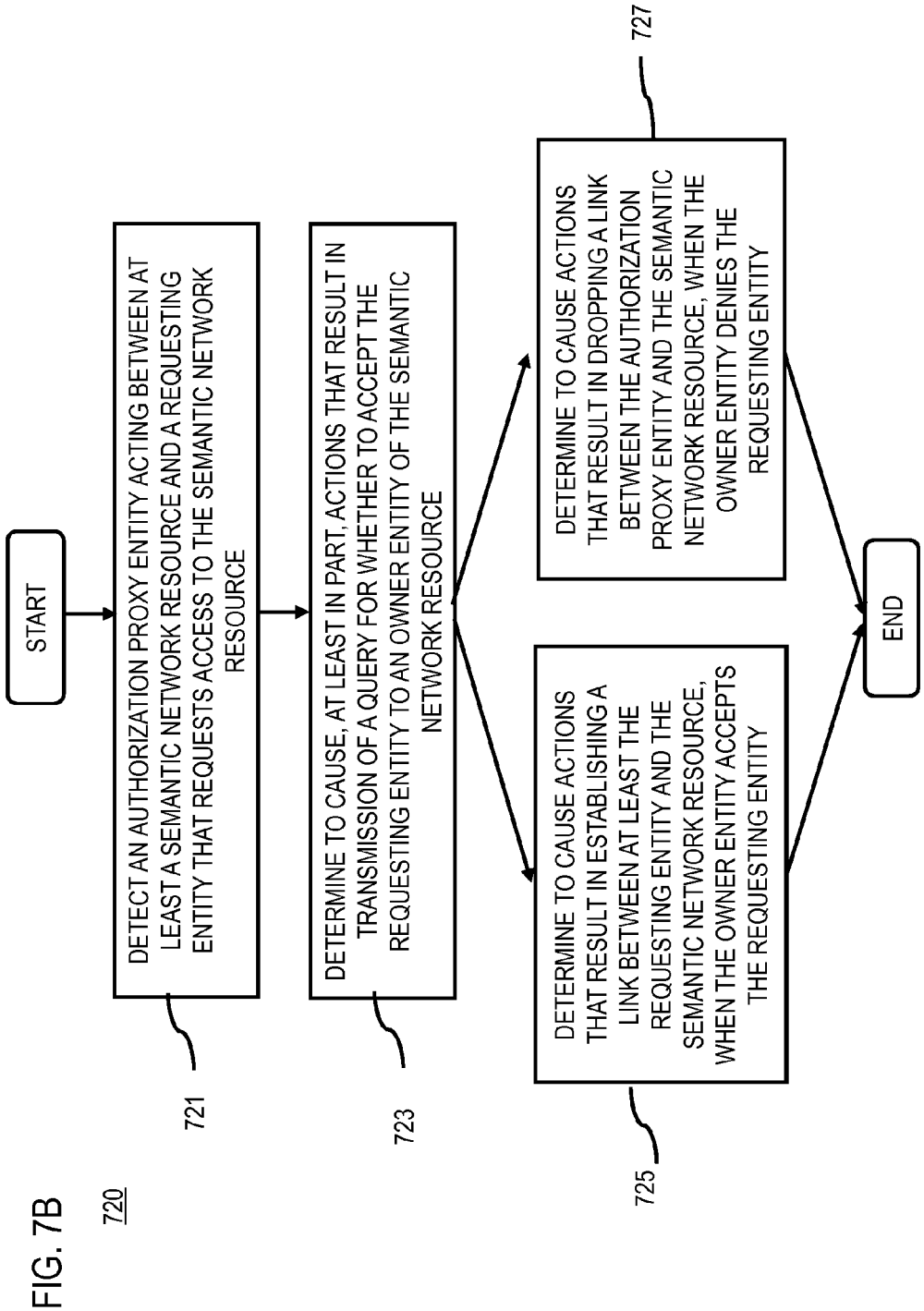

METHOD AND APPARATUS FOR PROVIDING REACTIVE AUTHORIZATION

BACKGROUND

Service providers (e.g., wireless, cellular, Internet, content, social network, etc.) and device manufacturers are continually challenged to deliver value and convenience to consumers by, for example, providing compelling network services and advancing the underlying technologies. One area of interest has been in developing methods to support generic data access via a data-centric architecture (such as the semantic web, the smart space, etc.). Typically, existing or conventional reactive authorization (e.g., authorization provided by a resource owner based on a request-by-request rather than on a pre-defined basis) relies upon service-specific protocols to access data. For example, multimedia communication sessions, such as voice and video calls over Internet Protocol (IP), generally use layers of protocols to access data. In a data-centric architecture, protocol operations are limited to the generic data manipulation such as get, update, delete, and query. Such a data-centric architecture provides a common framework for multiple protocols and systems to understand and process data content as well as to automate machine-to-machine communications. However, it is noted that the generic commands of existing service-specific protocols have limitations with respect to providing reactive authorization for a user to access data using only these generic commands with the existing service-specific protocols. Currently, a data store or database typically pre-defines its own data access policy.

Some Example Embodiments

Therefore, there is a need for an approach for providing reactive authorization for accessing a semantic network resource.

According to one embodiment, a method comprises detecting an authorization proxy entity acting between at least a semantic network resource and a requesting entity that requests access to the semantic network resource. The method also comprises determining to cause, at least in part, actions that result in transmission of a query for whether to accept the requesting entity to an owner entity of the semantic network resource.

According to another embodiment, an apparatus comprising at least one processor, and at least one memory including computer program code, the at least one memory and the computer program code configured to, with the at least one processor, cause, at least in part, the apparatus to detect an authorization proxy entity acting between at least a semantic network resource and a requesting entity that requests access to the semantic network resource. The apparatus also determines to cause, at least in part, actions that result in transmission of a query for whether to accept the requesting entity to an owner entity of the semantic network resource.

According to another embodiment, a computer-readable storage medium carrying one or more sequences of one or more instructions which, when executed by one or more processors, cause, at least in part, an apparatus to detect an authorization proxy entity acting between at least a semantic network resource and a requesting entity that requests access to the semantic network resource. The apparatus also determines to cause, at least in part, actions that result in transmission of a query for whether to accept the requesting entity to an owner entity of the semantic network resource.

According to another embodiment, an apparatus comprises means detecting an authorization proxy entity acting between at least a semantic network resource and a requesting entity that requests access to the semantic network resource. The apparatus also comprises means for determining to cause, at least in part, actions that result in transmission of a query for whether to accept the requesting entity to an owner entity of the semantic network resource.

According to one embodiment, a method comprises causing, at least in part, transmission of a request for accessing a semantic network resource. The method also comprises causing, at least in part, reception of a notification regarding authorization by an owner entity of the semantic network resource.

According to another embodiment, an apparatus comprising at least one processor, and at least one memory including computer program code, the at least one memory and the computer program code configured to, with the at least one processor, cause, at least in part, the apparatus to transmit a request for accessing a semantic network resource. The apparatus is also caused to receive a notification regarding authorization by an owner entity of the semantic network resource.

According to another embodiment, a computer-readable storage medium carrying one or more sequences of one or more instructions which, when executed by one or more processors, cause, at least in part, an apparatus to transmit a request for accessing a semantic network resource. The apparatus is also caused to receive a notification regarding authorization by an owner entity of the semantic network resource.

According to another embodiment, an apparatus comprises means for causing, at least in part, transmission of a request for accessing a semantic network resource. The apparatus also comprises means for causing, at least in part, reception of a notification regarding authorization by an owner entity of the semantic network resource.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7A-7B are flowcharts of processes for providing reactive authorization for accessing a semantic network resource, according to one embodiment;

DESCRIPTION OF SOME EMBODIMENTS

Figure 1:
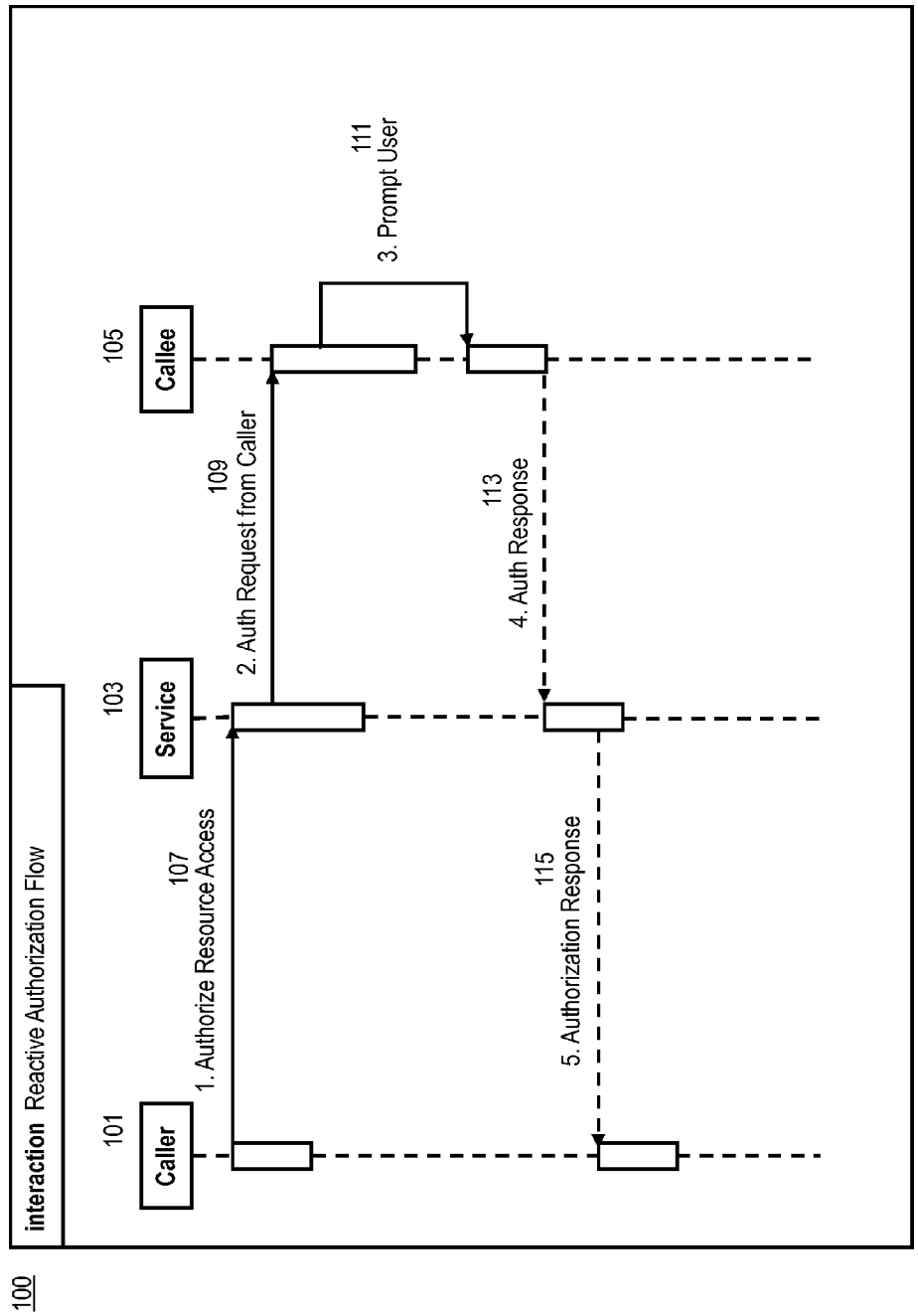
FIG. 1 is a diagram of a generic reactive authorization call sequence, according to one embodiment.

A method and apparatus for efficiently providing reactive authorization for accessing a semantic network resource are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "proactive authorization" refers to where resource access authorization policies have been pre-defined to identify the authorized and unauthorized users to access for a given resource. A conventional server consults with the stored authorization policies, using an authorization application programming interface (API) to determine if a requester is authorized to access on the given resource. If the requester is authorized to access, the server will notify the requester that the resource is available. If the requester is unauthorized to access, the server will notify the requester that the resource is unavailable.

As used herein, the term "reactive authorization" refers to where resource access authorization is given by the owner of the resource in response to a proxy request and based upon a reactive authorization policy defined by the owner of the resource. An access application implements the reactive authorization policy asks the owner for access permission at least for the first time access of a requester.

As used herein, the term "resource" refers to data or anything else capable of being defined in the semantic web for completing a project activity, such as people, equipment, facilities, funding, etc. Resource scheduling, availability and optimization are considered in data management. A resource can be a piece of data that a service provides to its users or allows its user to share. Familiar examples include an electronic document, an image, a service (e.g., "today's financial news on the Stock Exchange"), and a collection of other resources. It is noted that not all resources are network "retrievable", e.g., people, equipment, facilities, funding, bound books in a library, etc. For example, abstract concepts can be resources, such as the operators and operands of a mathematical equation, the types of a relationship (e.g., "parent" or "employee"), or numeric values (e.g., zero, one, and infinity). Providing a concept is given an identity, either the concept is expressed by an information representation format (e.g., Resource Description Framework (RDF) triples) or structure (e.g., RDF graphs), or its identity is expressed by given a well-formed Uniform Resource Identifier (URL), then the concept can be a resource as well.

As used herein, the term "triple" refers to a subject-predicate-object expression in RDF. A subject denotes the resource and is an RDF Uniform Resource Identifier (URI) reference or a blank node, a predicate is an RDF URI reference which denotes traits or aspects of the resource and expresses a relationship between the subject and the object, and an object is an RDF URI reference, a literal or a blank node. For example, one way to represent the notion "cat is a mammal" in RDF as the triple is: a subject denoting "cat," a predicate denoting "is a," and an object denoting "mammal."

The term "semantic web" refers to a universal medium for data, information, and knowledge exchange. This information exchange inserts documents with computer-comprehensible meaning (semantics) and makes them available on the semantic web. The semantic web is a "web of data" instead of the "web of documents". Knowledge in the semantic web is structured and organized at a finer level of granularity than free-text document, and the vocabulary includes not only literal words but also universal identifiers.

The term "smart space" refers to a plurality of information spaces of different entities in a "smart space architecture" that allows the entities and different semantic web tools to access heterogeneous information embedded in different semantic domains available for the semantic web tools. The semantic web is designed to share information based upon common representation formats, ontologies and semantics, such that information would become globally ubiquitous and interoperable. However much of the information is not desired to ubiquitous, but remain hidden, private and is interpreted locally, such as personal information. To address to this issue, the smart space architecture (an entity focused structure) is developed such that a user can encapsulate all of personal information and interact with the information in the smart space according to the user's individual semantics and needs. The user can be a person, an organization, or other entity.

Although various embodiments are described with respect to the smart space, it is contemplated that the approach described herein may be applied in other data-centric architectures in the semantic web.

FIG. 1 is a diagram of a generic reactive authorization call sequence, according to one embodiment. The approach of reactive authorization is commonly used in services and applications such as in messaging, social networking, etc. An originating party requests access to a resource, e.g., a photo album, presence attribute, message thread, etc. Under reactive authorization, the requested access is neither allowed nor denied by default. Instead, access to the requested resource is contingent on authorization or approval from the owner of the resource or another responsible party (e.g., depositories, custodians, data keepers, etc). By way of example, FIG. 1 shows a sequence of steps for a caller 101 making an asynchronous call via a service 103 to a callee 105. An authorization request (for a call, for access, etc.) is sent by the caller 101 to the service 103 in a transaction 107. In one embodiment, the caller 101 does not know who is responsible for making the decision regarding the authorization request. The service 103 knows who is responsible for making the decision and relays the authorization request to the appropriate authority (e.g., the callee 105) in a transaction 109. The callee/owner 105 receives the relayed authorization request and is prompted to make a decision of allowing or denying the access in a transaction 111. The decision-making process is fully asynchronous. In other words, the callee/owner 105 may postpone the decision, for example, to conduct background check on the caller 101, etc. . . . Eventually the decision (e.g., an authorization response) is made and sent to the service 103 in a transaction 113. The service 103 matches the authorization response with the original request and relays the authorization response to the caller 101 in a transaction 115.

Traditionally, the reactive authorization is addressed using a service-specific protocol. Thus, the following transactions in the protocol occur:

request access (Caller->Service)
authorization request (Service->Callee)
authorization response (Callee->Service)
authorization response (Service->Caller)

In the data-centric architecture, such as the smart space architecture, where the protocol operations are limited to the generic data manipulation such as get, update, delete, query, it is not possible to implement the reactive authorization with only these protocol transactions. Therefore, data stores have to pre-define the data access policies (e.g., proactive authorization), to operate with only the generic data manipulation.

By way of example, a user tries to join/receive a message thread that is available only for members. In the semantic web, this operation may, for example, establish a link between the "Thread" node and the "User" node using the relationship "member of." Thus, when the user attempts to manipulate the data via an application, the application tries to link the "User" object to the specific "Thread" object, and this operation either succeeds or fails. There are only two possible generic results in the predefined access policy: either accept or deny all requesters. If the operation requires reactive authorization (e.g., asking the owner), another mechanism needs to be used before linking can be done successfully.

To address this problem, a reactive authorization proxy (interchangeable with "authorization proxy") as described herein is designed to provide reactive authorization in a data-centric architecture, while still fully preserving the owner's control over the resource in the semantic space.

In one embodiment, an intermediate authorization proxy node is created by an access requester (e.g., a caller) in a RDF graph, and a RDF graph of the access requester is attached to it. The owner (e.g., a callee) detects the presence of the authorization proxy node and queries it for the requester or caller. The owner then decides whether to link (or discard) the requester to the RDF of the requested resource. In another embodiment, instead of discarding the requester, the owner changes the predicate to indicate the refusal of access. Thereafter, the requester or caller detects the changes to the authorization proxy and interprets it as a denial of the access request. All these transactions are done in a generic way and optionally transparently to the caller.

In the smart space, the owner can use one or more nodes (e.g., mobile telephones, computers, and similar terminals) to perform tasks, such as access to the RDF graph of the caller, without knowing anything about the nodes, and the nodes interoperate by communicating implicitly through smart spaces of different users without knowing each other. Such anonymity simplifies control, communication and coordination in the smart space, thereby reducing hardware and software operation time and costs.

The RDF graph of the caller may contain any information regarding the caller (personal background, etc.) for the owner to access. By check the caller's background information, the owner decides whether to accept or deny the caller's access. Therefore, the authorization proxy enables a data-centric architecture to provide reactive authorization with generic asynchronous mechanisms and similar data access policies for different services (e.g., emails, blogs, social networks, etc.) and the relevant applications.

In one embodiment, the smart space provides the data centric architecture where all data from all services lives in the cloud, and a device can access the cloud and cache the information locally if needed. The applications on the platform side interact with the cloud only, and the applications on the device side interact with the cloud via local caches and/or information stores. The applications on the device side provide, essentially, the view on the service data mash-up. Different client applications can provide different views on the same data.

Figure 2:
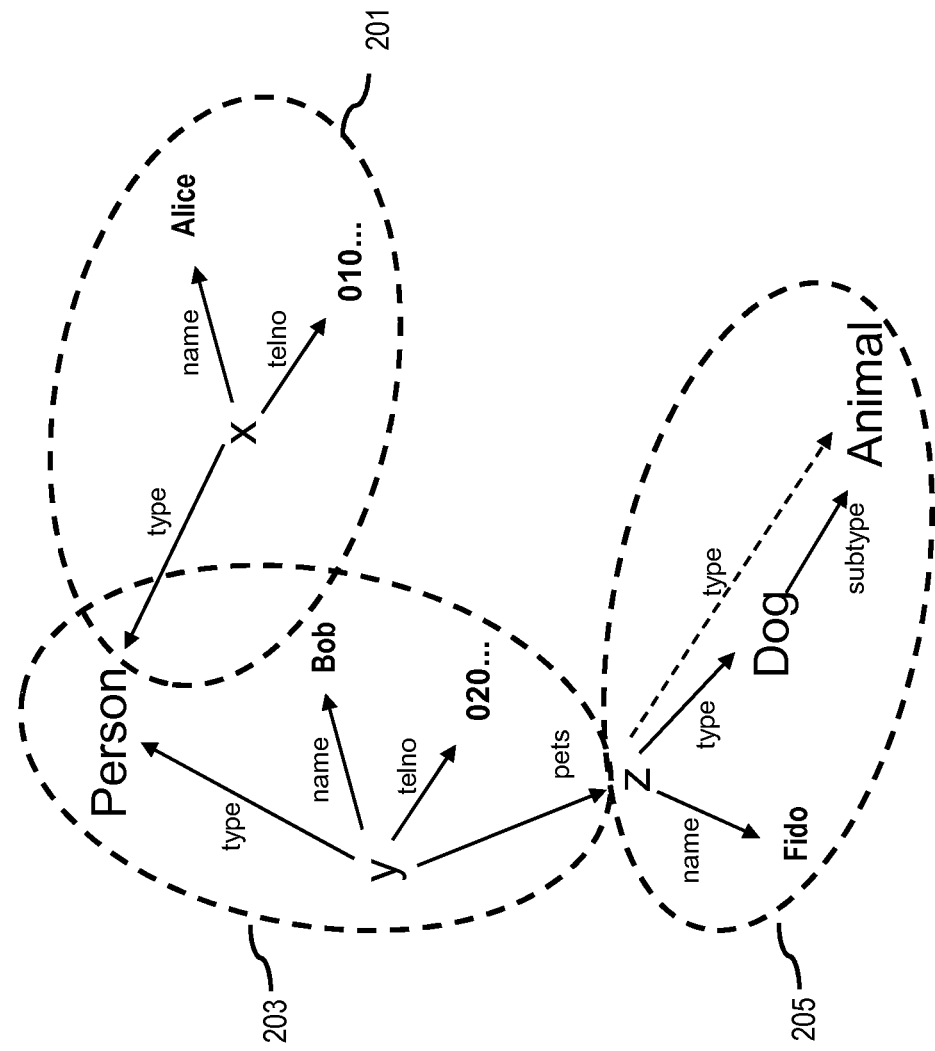
FIG. 2 is an example of a RDF graph, according to one embodiment.

FIG. 2 is an example of a RDF graph, according to one embodiment. The RDF graph includes (1) nodes (objects, vertices, etc.) representing the entities (concepts, etc.), and (2) edges (links) representing the relationships. This RDF graph contains three information subgraphs: One subgraph 101 of information regarding a person is represented by a uniform resource identifier (URI) "x," and shown within an oval in a broken line on the top right of FIG. 2 The subgraph 201 contains "Person" as the type information, "Alice" as the name information, and "010 . . . " as the telephone number information Another subgraph 203 of information regarding a person is represented by a URI "y," and shown within an oval in a broken line on the left of FIG. 1. The subgraph 203 contains "Person" as the type information, "Bob" as the name information, and "020 . . . " as the telephone number information. A third subgraph 205 of information regarding a pet is represented by a URI "z," and shown within an oval in a broken line on the bottom of FIG. 2. The third subgraph 205 contains "Animal" or "Dog" as the type information, "Fido" as the name information, "Animal" as the subtype information, and "y" as the owner information. A scope is the context within which a statement is valid.

By way of example, Alice wants to find out how Fido is doing. Since Alice's graph is already connected to Bob's graph and pre-approved to access Fido's graph, Alice can detect any changes to Bob's graph and Fido's graph as much as authorized by Bob. On the other hand, for a new user, such as Jenna, who has no existing connection with Bob, Jenna needs to contact Bob for authorization to access Fido's graph. The authorization proxy spares Jenna from being accepted or denied outright based upon a predefined access policy as in the existing systems.

The semantic model is different from the traditional (relational) model, and it is easy to extend. It supports backward/future compatibility. Data from multiple domains can be easily linked providing they have common points/nodes (people, places, items, locations . . . ). The semantic model supports graph-oriented query language(s) (e.g., SPARQL) suitable for making complicated multi-level queries, such as "find me animals of all my friends that are mammals and have fur."

In one embodiment, RDF query languages, such as SPARQL Protocol and RDF Query Language (SPARQL), were set with a mechanism for locally defining RDF graphs or subgraphs. These subgraphs or scopes may be embedded into the RDF query language and are defined explicitly in the form of RDF query language when the query is written. In another embodiment, a new RDF parameter type and macros (e.g., sets of commands) are used to manage RDF graphs representing queries in order to dynamically change queries and update query results in the semantic web. Although various embodiments are described here with respect to SPARQL, it is contemplated that the embodiments described in this application may be used with other RDF query languages such as WQL, DQL, N3QL, R-DEVICE, RDFQ, RDQ, RDQL, RQL/RVL, SeRQL, Versa, XUL, Adenine, etc.

Figure 3:
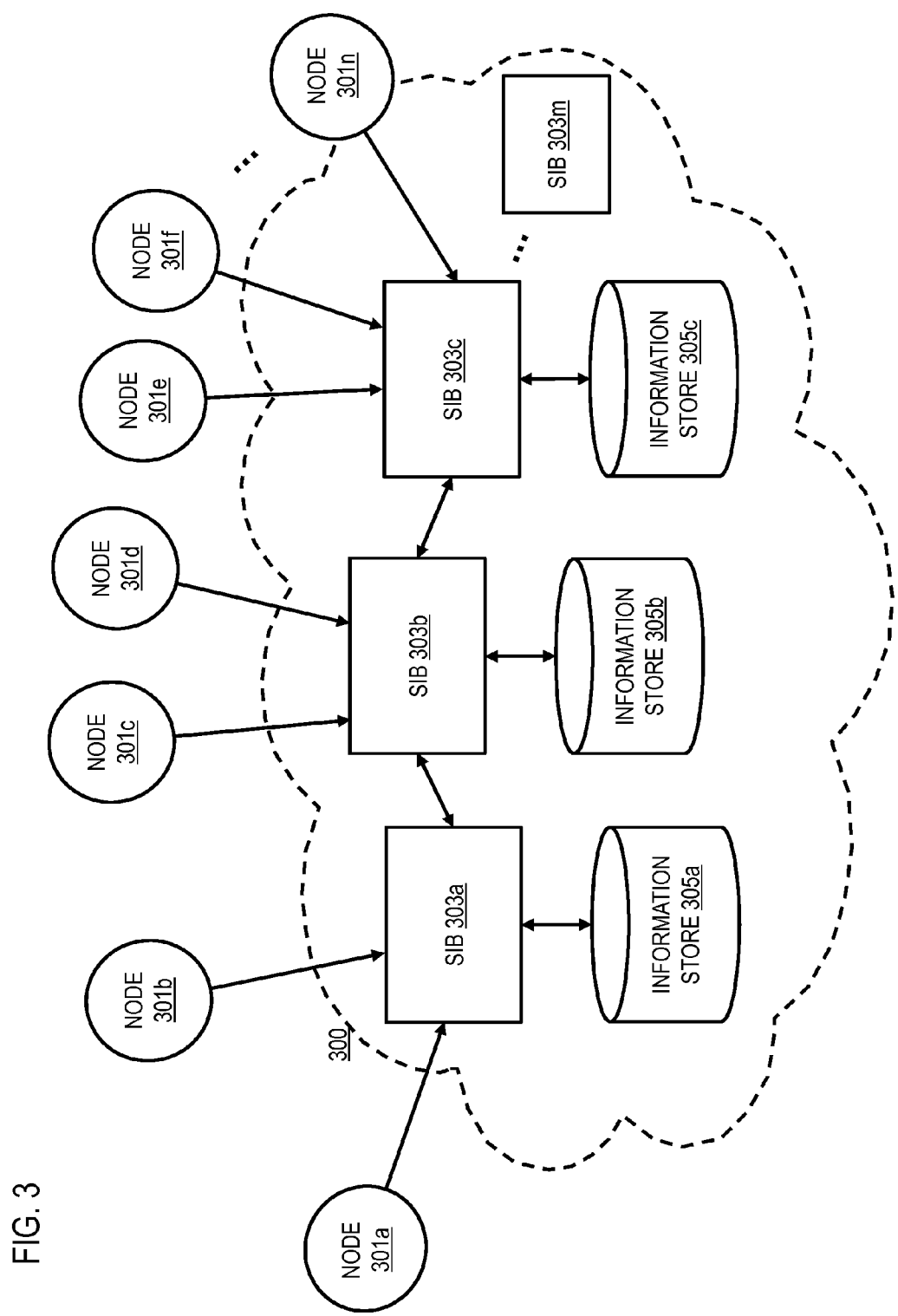
FIG. 3 is a diagram of a smart space logical architecture, according to one embodiment.

FIG. 3 is a diagram of a smart space logical architecture, according to one embodiment. A "smart space" refers to a plurality of information spaces of different entities in a "smart space architecture" that allows the entities and different semantic web tools to access heterogeneous information embedded in different semantic domains available for different semantic web tools as described herein. The smart spaces maintain privacy of personal information while allowing users to search over different ontology domains, different platforms, different equipment, and different vendors in the semantic web.

As mentioned, the smart space architecture (an entity focused structure) is developed such that a user can encapsulate all of personal information and interact with the information in the smart space according to the user's individual semantics and needs. The user can be a person, an organization, or other entity. Nodes 301 (including a user terminal node 301a) are provided in the smart space 300 as dynamic query resolution agencies which carry at least functions of the user agent application as discussed in the semantic web. Semantic information brokers (SIB) 303 are provided in the smart space 300 as entities performing information transaction operations. Local SIBs carry at least functions of the RDF cache or the cache manger while remote SIBs carry at least functions of the external databases.

An individual smart space 300 of the user is aggregated information set with information from different sources related to the user. For example, sources of the user's personal information, family information, work information, social network information, etc. Includes include (1) government records and databases, (2) employer databases; (3) credit card companies, banks, credit bureau database; (4) marketing survey and data mining databases, (5) user online behavior databases (browsing by a user via Internet, information mentioned by the user in the user's e-mails, calendar appointments, etc, (6) media items (articles, music, video, photos, etc. posted in blogs on web pages, etc.) created by the user, (7) articles, music, video, photos, etc. captured by the user, etc. These information contents are private and remain segregated from other information in the semantic web to protect the user's privacy. Only authenticated and authorized nodes, such as a credit card company, a bank, a trusted party, etc. of the user, are allowed to access the user's personal smart space to share the information such as the user's financial information, payment transactions, etc. stored in a local SIB (e.g., which may reside in the node 301a). It is up to each user to define what is available for whom. With the authorization proxy, the user does not have to predefine an access policy applicable to particular individuals and/or applicable to everyone. Rather, the user can decide when a requester asks for authorization.

As seen in FIG. 3, each smart space is distributed across at least one set of nodes belonging to at least one user. In this embodiment, the smart space 300 is distributed across multiple nodes 301a-301n that each belong to multiple users. For example, nodes 301a and 301b belong to a first user, while nodes 301c-301f belong to a second user. It is also contemplated that one or more of the nodes (e.g., node 301n) may belong to a centralized information provider. Nodes 301 are personal/individual in that they perform tasks either directly decided by the user or autonomously for or on behalf of the user. For example, the nodes 301 can monitor predetermined situations or reason/data-mine information available in the smart space 300.

By way of example, with the personal information, nodes of the credit card company and the bank can facilitate a purchase by the user via interacting with the user terminal node 301a, with minimum or even no user involvement. For example, when the user browses a website for flight tickets, a website node interacts with the user terminal node 301a to prompt the user to selecting tickets that fit the user's criteria. The user taps on the screen of the user terminal node 301a to select tickets, and then informs the website node to go ahead charging the user's credit card for the tickets, without asking the user to enter user financial data.

A node 301 may connect to one or more smart spaces 300 at a time. Moreover, the specific smart spaces 300 and to which the node 301 is connected may vary over the lifetime of a node. Mobility of nodes 301 is provided by moving links to the smart space 300 rather than moving a physical running process of the smart space 300. The node 301 can save its state and become 'mobile' when another node 301 restores that state. Nodes 301 themselves are anonymous and independent of each other—there is no explicit control flow between the nodes 301 other than that provided through preconditions to node actions. A coordination model based around expressing coordination structures as first-order entities and focusing on collecting reasoning and context. Control flow can be made outside of the smart space 300 through nodes 301 and the applications serving the nodes 301 explicitly sharing details of their external interfaces through the smart space 300. The responsibilities of nodes 301 range from user-interaction to reasoning and performing tasks such as truth maintenance, belief revision, information consistency management etc.

The nodes 301 access information in the smart space 300 through the SIBs 303a-303m by connecting to any of the SIBs 303 making up the smart space 300 by whatever connectivity mechanisms (e.g., connectivity over a data network, the Internet, etc.) the SIBs 303 offer. Usually, the connection is over some network (e.g., data network, wireless network, telephony network, service provider network, etc.), and the nodes 301 are running on various devices. For example, the node 301 may be supported on any type of mobile terminal, fixed terminal, or portable terminal including a mobile handset, station, unit, device, multimedia tablet, Internet node, communicator, desktop computer, laptop computer, Personal Digital Assistants (PDAs), or any combination thereof. It is also contemplated that the device supporting the node 301 can support any type of interface to the user (such as "wearable" circuitry, etc.).

Additionally, a communication network (not shown) capable of supporting the smart space 100 can include one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

Each SIB 303 performs information transaction operations, possibly co-operating with other SIBs 303, for the smart space 300. In one embodiment, an SIB 303 may be a concrete or virtual entity. Each SIB 303 supports nodes 301 interacting with other SIBs 303 through information transaction operations. In this embodiment, the smart space 300 includes SIBs 303a-303m each connected to respective information stores 305a-305c. Each information store 305 of the smart space 300 stores the information of the nodes 301, and any other information available over the smart space 300. This can include, for example, information of a current state or activity of the node 301, observations of the outside information world, maintenance information, and the like. The smart space 300 applies a 'publish and read' mechanism at dedicated information stores 305a-305c. A publishing node does not need to be interoperable with the reading node. In fact the two even do not need to know about each other. The smart space 300 simply facilitates the publisher to publish at the selected information store and the reader node to read there.

Synchronization between these distributed, individual information stores 305 is asymmetric according to device and network capabilities as well as the user's needs in terms of security, privacy, etc. For example, private information about a user's family is stored at the user's home location where stricter information security policies can protect the information. The private information can then be augmented by non-private information at a website (e.g., a social networking website) without actually transferring the private information to the website. In this case, augmenting information is preferable to merging information due to, for instance, copyright and/or privacy concerns.

Interaction among smart spaces 300 is nominally conducted by the nodes 301 which encapsulate fine grained functionality to be distributed across any number of devices that have access to one or more of the smart spaces 300. The smart spaces 300 themselves can interact through merging and projection thereby enabling larger smart spaces 300 to be constructed either on a permanent or temporary basis. Moreover, the smart space 300 may be a personal space, a share/social space of at least two users, a group space, a public space of a community, a county, a state, or a county, etc., and the like. The aggregation of all smart spaces 300 constitutes the world of information (including the semantic web) which is also referred to as a smart space. A smart space 300 including the entire world of information also supports all services (including all platforms and vendors) available in the world, as well as all of the world's devices and equipment.

The smart space 300 is interoperable over different information domains, different service platforms, and different devices and equipment. For example, the smart space 300 accommodates transmission control protocol/Internet protocol (TCP/IP), Unified Protocol (UniPro) created by the Mobile Industry Processor Interface (MIPI) Alliance, Bluetooth protocol Radio Frequency Communication (RF-COMM), IPv6 over Low power Wireless Personal Area Networks (6LoWPAN), etc. The smart space 300 also covers technologies used for discovering and using services, such as Bluetooth/human interface device (HID) services, web services, services certified by the Digital Living Network Alliance (DLNA), the Network on Terminal Architecture (NoTA), etc. The smart space constitutes an infrastructure that enables scalable producer-consumer transactions for information, and supports multiparts, multidevices and multivendors (M3), via a common representation of a set of concepts within a domain (such as a RDF domain) and the relationships between those concepts, e.g., ontologies. The smart space 300 as a logical architecture has no dependencies on any network architecture but it is implemented on top of practically any connectivity solution. Since there is no specific service level architecture in the smart space 300, the smart space 300 has no limitation in physical distance or transport. The smart space 300 architecture allows user devices purchased at different times and from different vendors to work together. For example, the user can listen/watch/etc. To music/movies/etc. wherever the user is using one personal device in the vicinity of high quality speakers or display. In addition, the smart space 300 architecture allows application developers to mash-up services in different domains, instead of trying to port an application to all platforms and configurations. The smart space architecture also allows device manufacturers to make interoperable products, so that consumers have no concern about compatibility of different products and accessories.

A smart space 300 transcends over many of the user's devices (e.g., mobile phones, media centers, personal computers, servers, routers, etc.) enabling the distribution of information and queries upon that information over any of the user's devices. For any node 301 accessing the information, the physical location of the node 301 and the location of the information are irrelevant, e.g., a node 301 sees the 'totality' of all information in that smart space 300. By way of example, the nodes 301 access the smart space 300 with basic operations including Insert (to insert information into a smart space), Remove (to remove information from a smart space), Update (to update information in a smart space, which is effectively an atomic remove and insert combination), Query (to query for information in a smart space), Subscribe (to set up a persistent query in a smart space such that a change in the query results is communicated to the subscribing node), other query management operations (e.g., notification, etc.) as discussed with respect to the query application 307a, etc. The nodes 301 communicate implicitly by inserting information to the smart space 300 and querying the information in the space 300.

Various embodiments are described herein with respect to query management in the smart space. By way of example, RDF is used in the smart space 300 to store information in information stores 305a-305c. RDF allows joining data in vocabularies from different business domains without having to negotiate structural differences between the vocabularies. In addition, via the RDF, the smart space 300 merges the information of the embedded domains with the information on the semantic web, as well as makes the vast reasoning and ontology theories, practices and tools developed by the semantic web community available for application development in the smart space 300. The smart space 300 also makes the heterogeneous information in embedded domains available to the semantic web tools.

Figure 4:
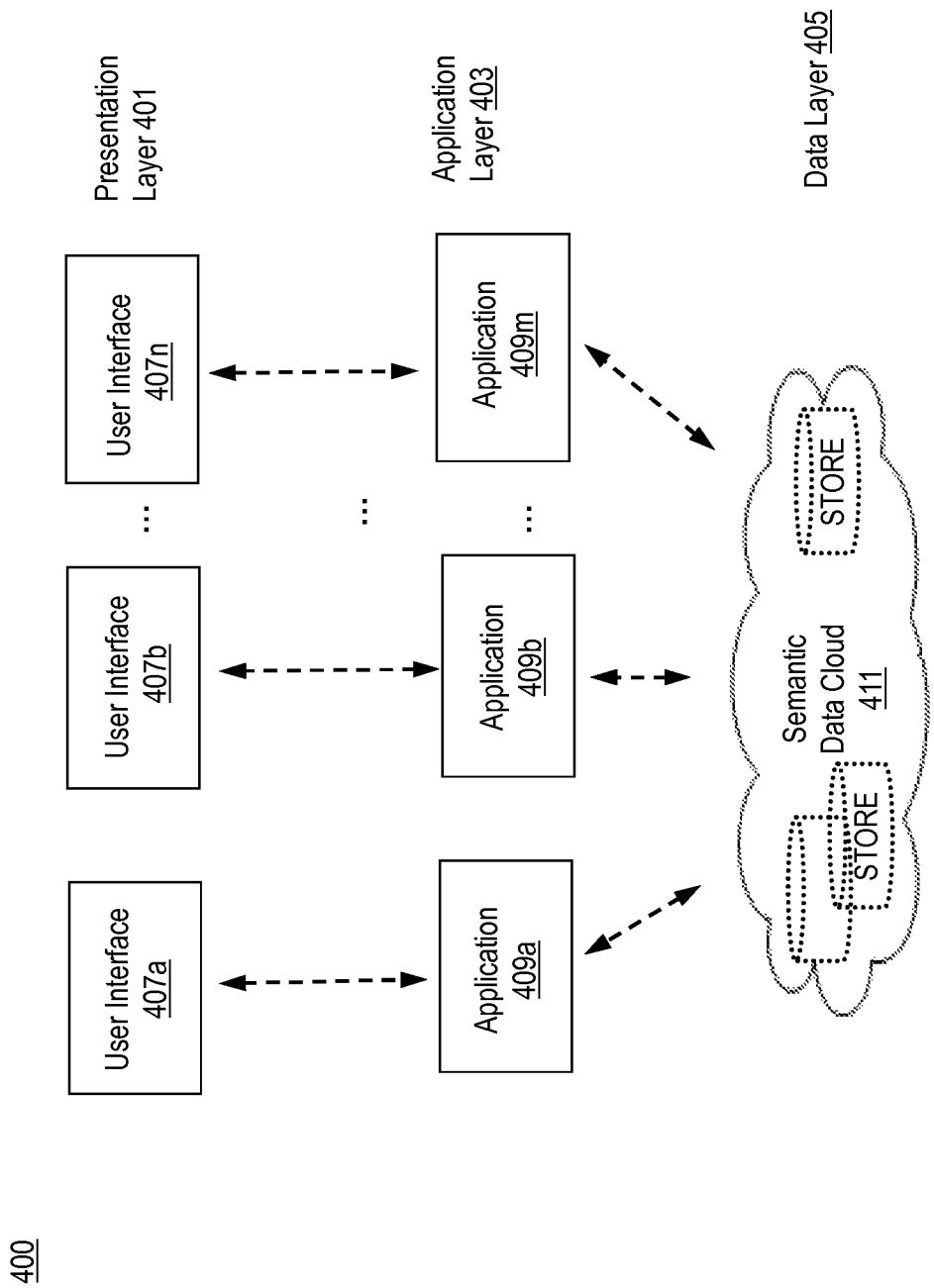
FIG. 4 is a diagram of a smart space interoperability architecture, according to one embodiment.

FIG. 4 is a diagram of a smart space interoperability architecture, according to one embodiment. The smart space interoperability architecture 400 includes three layers: a presentation layer 401 implemented at the node level to support different user interfaces 407, an application layer 403 implemented at the SIB level to support different applications 409 (preferable open source software) running on sharing computing platform, and a data layer 405 implemented at the information store level to exchange data among the information stores in a semantic data cloud 411 (details shown in FIG. 3). The semantic data cloud 411 contains common ontology models and common data formats.

While the semantic web envisions a single, universal web of machine-understandable information, the smart space interoperability architecture 400 organizes the machine-machine communication by setting up in distinct spots (e.g., information stores, etc.) of information exchange. At each spot a number of pieces of applications 409a, 409b, . . . , 409m executing in potentially many device nodes of potentially many kinds may publish and read semantic information. This information may not be prepared in machine readable form. The semantic information can be adapted to different applications that process different information composed for given topics based on user profiles and preferences.

In another embodiment, this information is prepared explicitly for each particular spot. Any particular spot of information exchange has a particular purpose or focus. In other words, the information made available by a particular spot is dedicated to the particular purpose or focus of that spot. The number of pieces of software exchanging information at a particular spot is consequently limited to those that share this dedication.

In the existing hypertext internet interoperability architecture, the implementation of a data structure usually requires writing a set of procedures that create and manipulate instances of that structure. The data structure is defined indirectly by the operations that may be performed on it, and the mathematical properties of those operations (including their space and time cost). The efficiency of a data structure is analyzed together with those operations. Many files on a typical computer can be loosely divided into documents and data. Documents like mail messages, reports, and brochures are human-readable. Data, like calendars, address books, playlists, and spreadsheets are presented using an application program which lets them be viewed, searched and combined.

In the smart space interoperability architecture 400, all data is represented semantically, e.g., in languages specifically designed for data. The semantic web has classes with attributes and the concept of instances or objects. Its data layer 405 provides information stores, user profiles, and rules databases of different data models defined semantically. The semantic data stores correspond to the semantic representation of content data, application data, etc. A user profile stores user background, user preferences, user context, etc. The rules database stores the set of rules linking user profiles to the content data, user interfaces, and topics in the applications. Application data, their relationships, user profiles, and rules can be stored using any relational databases or RDF graphs.

In the smart space interoperability architecture 400, SIBs 303 and agents and the nodes 301 in FIG. 3 handle different applications 409a, 409b . . . 409m that assume various functions shared by or tailored for different service applications, such as rule interpreters, adaptive engines, etc. A significant difference between hypertext internet applications and semantic web applications is that the data representation in a semantic web application is semantically defined rather than just logical. The rules interpreter reads the rules stored in the data layer 405 and triggers them based on the user profiles, etc. The adaptive engines adapt the presentation and navigation based on the user profiles, as well as the status of the user in the application. In the smart space, use cases are considered in which a set of agents executing in various nodes mash-up the information that these agents store and retrieve in/from a particular SIB. This collaboration of the agents forms the application, while collaboration and mash-up of information occurs depends on the data available.

Applications are constructed to be executed by the agents and SIBs in a collaborating manner through information sharing, rather than in the monolithic manner as in the hypertext internet interoperability architecture. Depending upon the particular situation and context that the user is either experiencing or requires at that time, the agents can provide a monolithic style user-interface at the presentation layer 401.

In the smart space interoperability architecture 400, the user interfaces 407 reside in the nodes 301 in FIG. 3. In another embodiment, the presentation layer 401 can also provide different user interfaces 407a, 407b, . . . 407n adapted for different presentation and navigation. A user interface in a semantic web application is flexible enough to compose a web page based on the available presentation and navigational elements instead of a fixed page design as in hypertext internet applications. Adaptive presentation adapts the contents of the page based on the user profiles. Adaptive navigation adapts the navigational elements and scenarios based on the user profiles. An adaptive user interface with adaptive presentation and adaptive navigation can be implemented using a user interface framework such as Websphere Portal, JSF, Tapestry, etc. providing capabilities to adapt the contents of the user interface to different users in various use cases, such as email, blog, etc.

Figure 5:
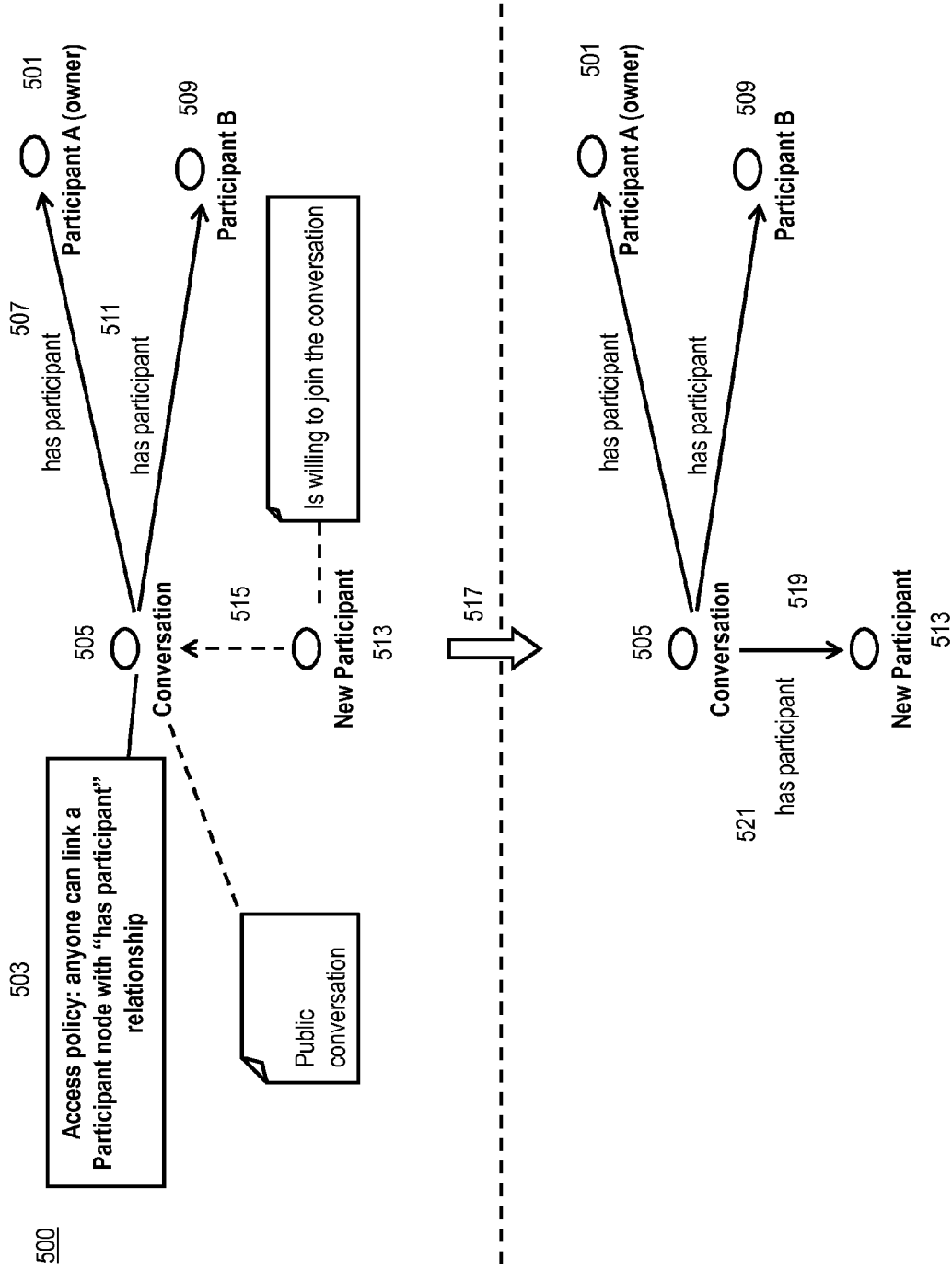
FIG. 5 is a diagram of proactive authorization in a smart space where access is allowed by default, according to one embodiment.
Figure 6:
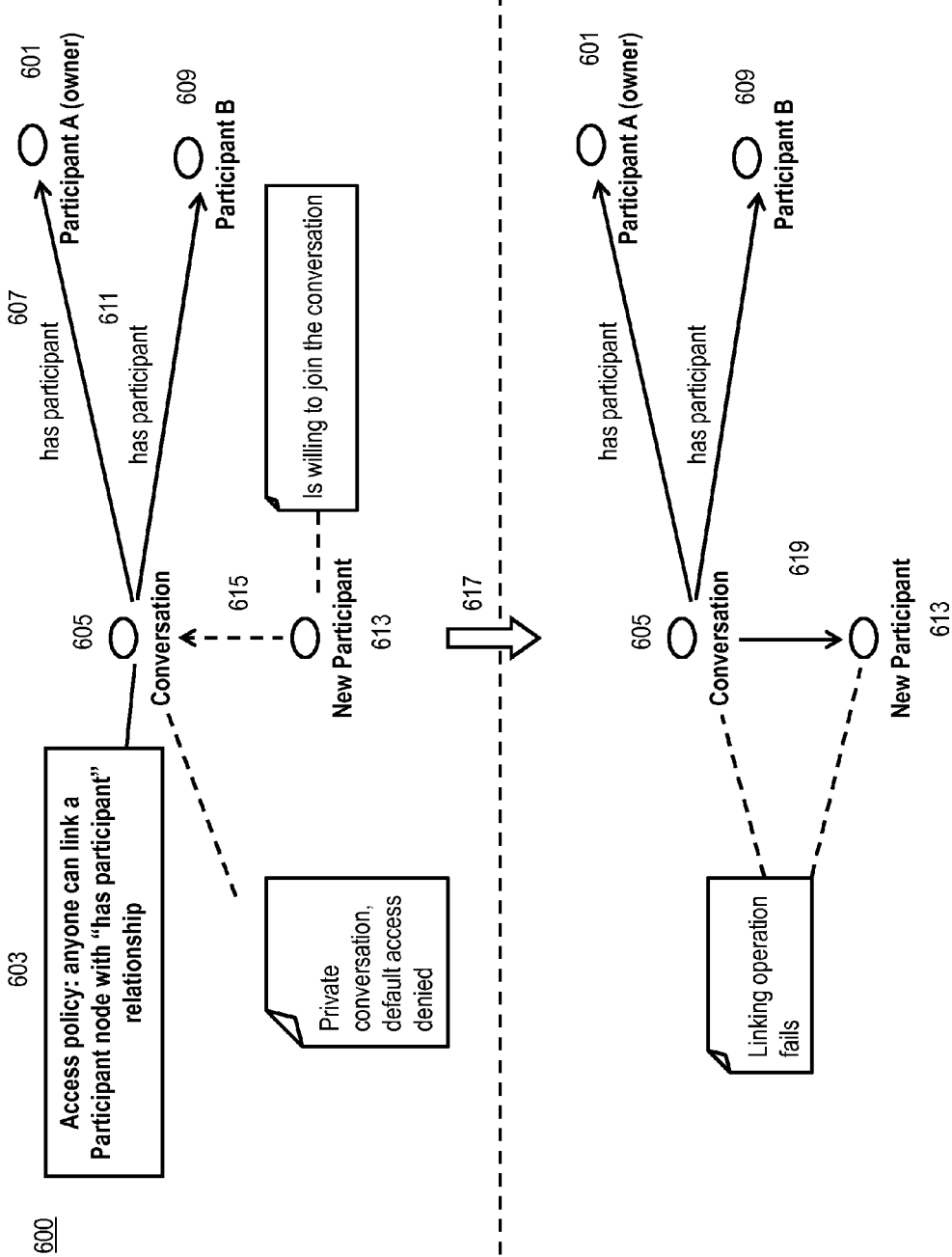
FIG. 6 is a diagram of proactive authorization in a smart space where access is denied by default, according to one embodiment.

To better understand the reactive authorization process in a semantic environment, two proactive authorization processes are shown in FIG. 5 and FIG. 6. In a semantic environment, all information basic units (e.g., a triple), fragments, named documents, documents, are represented according to the RDF. In a data-centric architecture such as the smart space, proactive authorization can be used by the owner of a resource to control access rights. It is noted that typically generic data manipulation protocol (e.g., a protocol that supports data manipulation commands such as get, update, delete, and query) can implement proactive authorization, but implementing reactive authorization under the same protocol can be quite challenging.

FIG. 5 is a diagram of proactive authorization 500 in a smart space where access is allowed by default, according to one embodiment. In this embodiment, a node 501, who is the owner (e.g., Bob) of a resource/node (e.g., a conversation 505, a dog Fido, etc.), defines an access policy 503 for other nodes to access the conversation 505. The access policy 503 is set as that any node of a type of "Participant" can link to the conversation node 505 to establish a relationship/link with the conversation 505 as "has participant." As a result, the conversation node 505 is open to the public. By way of example, anyone is allowed to link to the resource node of Fido (e.g., Bob's dog), so they can view the RDF graph of Fido that includes Fido's shot records, etc. Other examples include online website resources of corporations, institutions, non-profit organization, governments, etc., free web dictionaries, news; shopping data, etc.

The process 500 starts with a participant A (e.g., the owner) and a participant B (e.g., Alice). Their corresponding nodes 501, 509 respectively establish relationships/links 507, 511 with the conversation node 505 as "has participant." If a new participant (e.g., Jenna) wants to join the conversation, its access application attempts to link its node 513 to the conversation node 505. The access application of the new participant node 513 sends a request 515, in order to link the participant node 513 to the conversation node 505. As shown by a process flow 517, the conversation node 505 then sends an approval 519 (e.g., "OK") to the new node 513. Therefore, the new node 513 establishes a relationship/link 521 with the conversation node 505 as "has participant."

The smart space provides an event subscription mechanism which allows any authorized application to subscribe to a particular data query or access request, and be notified if the query or request result set changes. This allows, for example, the owner node 501 of the conversation to subscribe to any link changes to itself or to the resource 505, and be notified when a new node (e.g., the new node 513) is linked to it or to the resource 505, or unlinked from it, or updated while being linked, etc.

FIG. 6 is a diagram of proactive authorization in a smart space where access is denied by default, according to one embodiment. In this embodiment, a node 601, who is the owner (e.g., Bob) of a resource/node (e.g., a confidential conversation 605, Bob's financial data, etc.), defines an access policy 603 for other nodes to access the conversation 605. The access policy 603 is set as that no node of a type of "Participant" can link to the conversation node 605 to establish a relationship/link with the conversation 605 as "has participant." As a result, the conversation node 605 is close to the public, e.g., private. By way of example, no one is allowed to link to the resource node of Bob's financial information (e.g., bank account number and password, tax return, investment portfolio, etc). Other examples include confidential databases of military security, privacy data (e.g., patient records, employee salary, etc.), etc.; commercial secret resources (e.g., business agreements, etc), etc.

The process 600 starts with the participant A (e.g., the owner) and a participant B (e.g., Bob's financial advisor). Their corresponding nodes 601, 609 respectively establish relationships/links 607, 611 with the conversation node 605 as "has participant." If a new participant (e.g., Bob's girlfriend) wants to join the conversation, its access application attempts to link its node 613 to the conversation node 605. The access application of the new participant sends a request 615 to link the participant node 613 to the conversation node 605. As shown by a process flow 617, the conversation node 505 then sends a denial 619 (e.g., "ACCESS_DENIED") to the new node 613. Therefore, the new node 613 fails to link with the conversation node 505.

Referring back to FIG. 4, the proactive authorization implemented in a smart space relies on predefined access rules for handling the generic data manipulation operations (such as get, update, delete, and query). In one embodiment, these access rules are preset in advance and controlled by the resource owner. By way of example, the resource owner controls the access rules via the same set of generic data manipulation operations. In case of proactive authorization, an application designer of the use case application 409*a* sets the access rules for the resource at the data layer 405 and these access rules are controlled only by the specific application 409*a*. Alternatively, the resource owner sets access rules via the user interface application 407*a* and the use case application 409*a*. This approach works similarly for traditional applications and smart space applications.

In contrast, to implement the reactive authorization, the existing hypertext internet interoperability architecture involves different applications for different use cases (e.g., email, blog, web feed, etc.) to authorize access to data in different data models with special and complicated commands. These commands typically employ horizontal communications between different entities within the application layer 403. By way of example, reactive authorization can generate communications from a user interface application 407*b* to the user case application 409*b*, then to the user case application 409*a*, and then to the user interface application 407*a*. Thereafter, the user interface applications 407*a*, 409*a* may have to modify the access rules for some of the data in the data layer 405. The modification is then communicated back from the user case application 409*a* to the user case application 409*b* and eventually to the user interface application 407*b*. In smart spaces, communications within the same layer are discouraged because these communications often perform operations out of the scope of the generic data manipulation protocol. As discussed in the later embodiments, the reactive authorization implemented in the smart space uses an Authorization Proxy to request the resource owner fro the resource access. The Authorization Proxy is an entity residing within the data layer 405, which is accessed by all entities from the application layer 403 in a unified way. By allowing these communications via the Authorization Proxy to happen in the data layer 405, the embodiments achieve simplicity and eliminate the need for another signaling protocol.

Figure 7A:
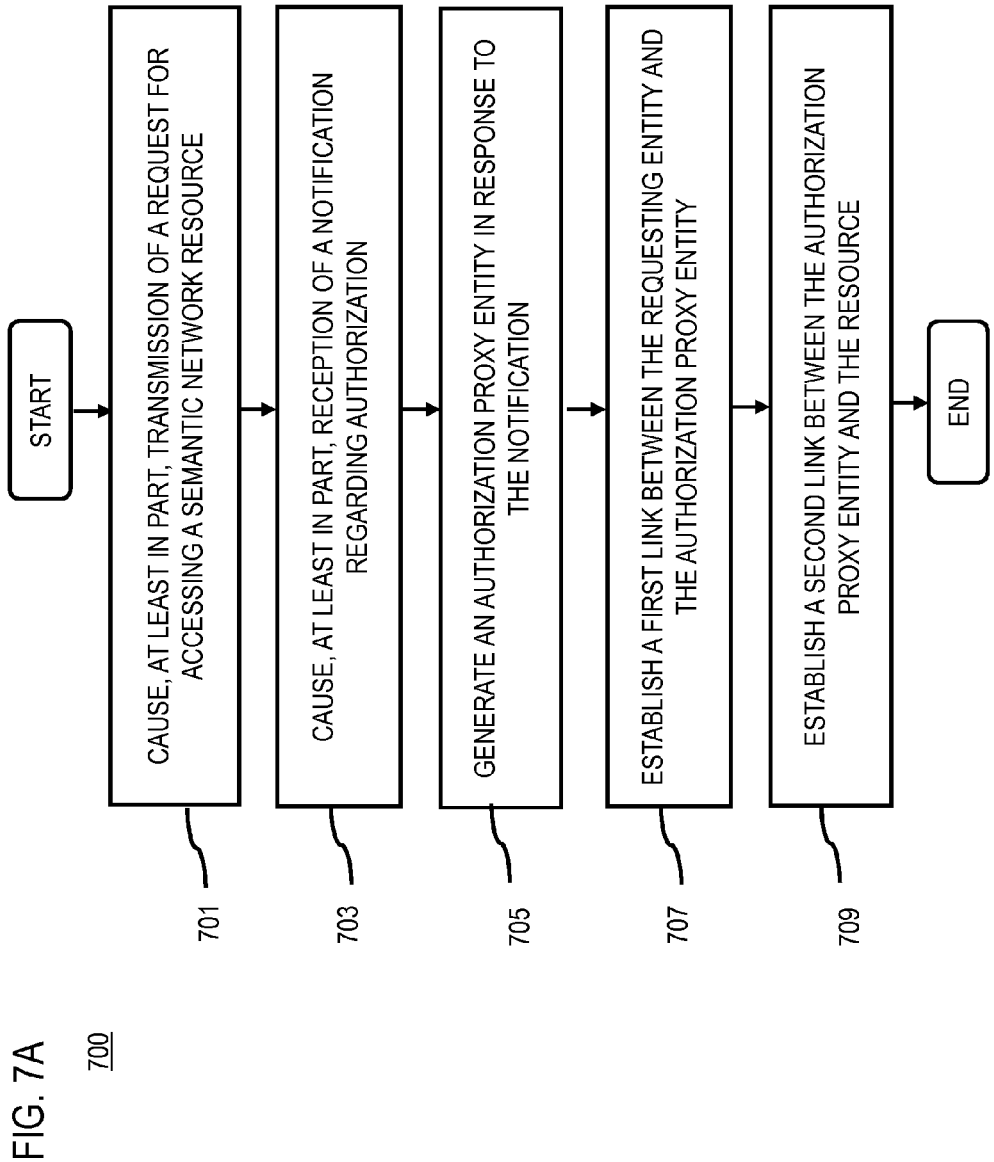

FIG. 7A is a flowchart of a process 700 for providing reactive authorization for accessing a semantic network resource, according to one embodiment. An entity has a distinct, separate virtual or physical existence. An entity may be a legal entity (e.g., an individual, origination, business, non-profit, government, etc.), computer abstractions and animate, a root node that stands for the universal class of individuals, an active routine within a programming layer, etc.

Prior to the process 700, a resource owner's access application sets up a reactive access policy for accessing a semantic network resource (e.g., a blog, a multimedia game, ac conference call, etc.). The access policy is set in Table 1 as follows:

TABLE 1

1. "Always allow" the owner to link nodes, including nodes of a type "Participant," to the resource.
2. "By invitation only" by default for linking nodes of the type "Participant."
3. "Always allow" by default any users to link to a node of a type "Authorization Proxy."
4. "Deny" for any other objects and any users.

By way of example, Rule 1 enables the owner to link, essentially, any types of nodes, including "Participant" nodes. The "owner" in the Rule 1 refers to the identity of the owner, not a node class. As shown, Rule 2 is straight <"By invitation only" by default for the node of type "Participant" for everyone except the owner>. Rule 2 is directly applied to a triple (e.g., a participant node), not to a group of two or more "chained" triples. Any triple(s) between the owner node and a new participant node, such as the Authorization Proxy node, is transparent to the owner node in this context. The "user" in Rule 3 refers to the identity of the user, not the node class. The access application of the owner uses the new node, the new property of the new node, and the identity of the user to perform a single INSERT (i.e. "link") operation to the Authorization Proxy node according to Rule 3. The access policy executes the rules in order. Until a first match is found to authorize the access, Rule 4 denies access by any other objects and any user.

In one embodiment, the Authorization Proxy has its own access policy. By default, the requester can attach any object to the Authorization Proxy because the requester creates and owns the Authorization Proxy node. As set in the reactive access policy for a resource node as shown in Table 2, any linking request from a Participant node to the resource results in sending a notification of the "AUTHORIZATION_REQUIRED" status code from the resource to the Participant node. In other words, a semantic database in the semantic web or the semantic data cloud in the smart space handles a notification of authorization of this linking request and sends the AUTH_REQUIRED status code to the requesting entity. The access application of the requesting entity interprets the notification as a requirement to request for the owner's permission first.

TABLE 2

(<For LINK operation for ALL users but OWNER - AUTH_REQUIRED>)

Figure 11:
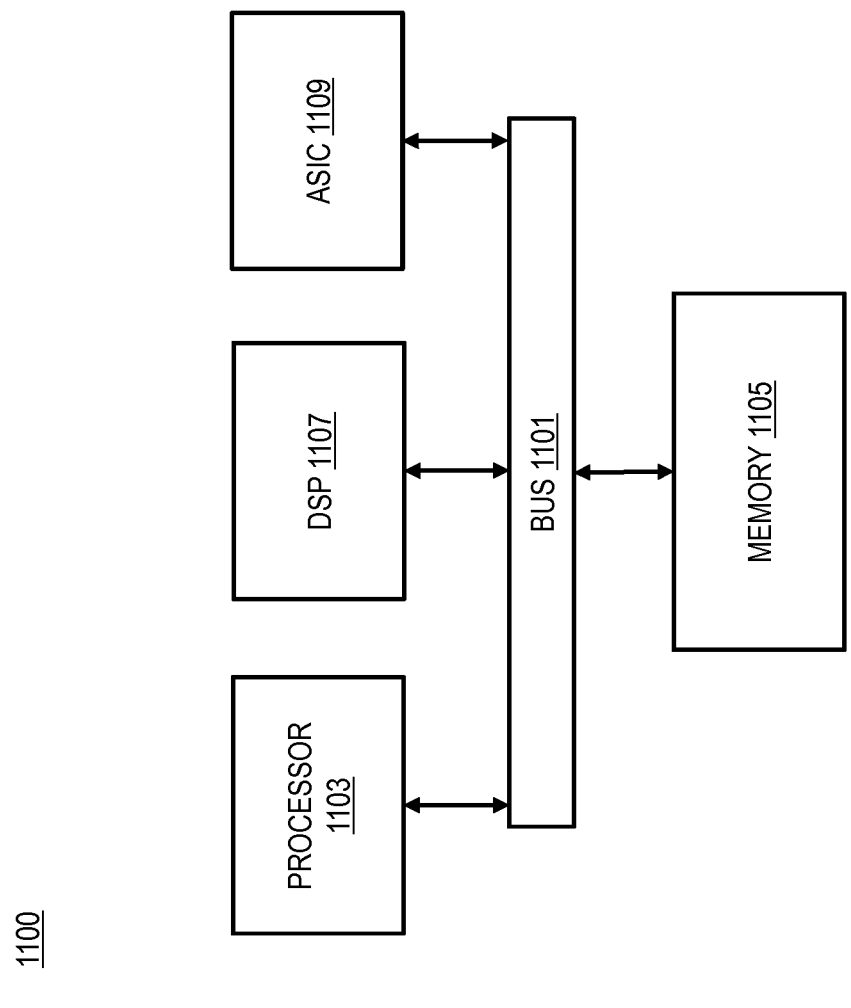
FIG. 11 is a diagram of a chip set that can be used to implement an embodiment of the invention.

Referring back to FIG. 7A, in one embodiment, the access application of a new participant node performs the process 700 and is implemented in, for instance, a chip set including a processor and a memory as shown FIG. 11. In step 701, the new participant's access application, causes, at least in part, transmission of a request for accessing a semantic network resource to the resource. The new participant's access application causes, at least in part, reception of the notification of the status code "Authorization required" from the resource (Step 703). In response to the notification, the new participant's access application generates an authorization proxy entity (Step 705). The new participant's access application establishes a first link between the requesting entity and the authorization proxy entity (Step 707). The new participant's access application establishes a second link between the authorization proxy entity and the resource (Step 709). Thereafter, when detecting a direct link to the resource, the new participant's access application accesses the resource through the direct link. Alternatively, the new participant's access application drops the first link, when the owner entity denies the request.

FIG. 7B is a flowchart of a process 720 for providing reactive authorization for accessing a semantic network resource, according to one embodiment. In one embodiment, the access application of the owner node performs the process 720 and is implemented in, for instance, a chip set including a processor and a memory as shown FIG. 11. In step 721, the owner's access application detects (e.g., through the event subscription mechanism) the authorization proxy entity acting between at least a semantic network resource and a requesting entity that requests access to the semantic network resource. In one embodiment, the authorization proxy entity is detected via the first link between the semantic network resource and the authorization proxy entity. As discussed, the authorization proxy entity being created according to the reactive access policy for accessing the resource. The owner's access application subscribes to a change to the resource, a change of links to the resource, or a combination thereof. The subscription mechanism is similar to a regular database trigger. The trigger in a semantic database or the semantic data cloud enables an application to register to receive notifications when a change is done to a fragment of the graph the application wants to monitor.

The owner's access application then detects the requesting entity via the first link and a second link between the requesting entity and the authorization proxy entity. The approach of reactive authorization can be applied to different use cases, such as participating in a conversation, call, conference, conference call, concert, multimedia presentation (of movie, music, etc.), game, 2D or 3D games, etc.; account creation/registration (while confirmation is pending), posting a new message to a blog/forum/website that requires moderator's approval, permission to subscribe to a particular query and/or query results, etc.

Thereafter, the owner's access application determines to cause, at least in part, actions that result in transmission of a query for whether to accept the requesting entity to an owner entity of the semantic network resource (Step 723). The determination is made at least in part based upon the reactive access policy. Each of the query, the request, the notification, the query, and the resource are represented by a semantic graph.

In addition, the owner's access application determines to cause actions that result in establishing a link between at least the requesting entity and the semantic network resource, when the owner entity accepts the requesting entity (Step 725), or determine to cause actions that result in dropping a link between the authorization proxy entity and the semantic network resource, when the owner entity denies the requesting entity (Step 727). The determinations are also made at least in part based upon the reactive access policy. In other words, the owner's access application can establish a third link between the requesting entity and the resource, when the owner entity accepts the request. The owner's access application retrieves though the first and second links semantic information of the requesting entity; and causes, at least in part, presenting the semantic information to the owner entity. Otherwise, the owner's access application drops the first link, when the owner entity denies the request or after a predetermined time has passed since the query transmission.

Figure 8A:
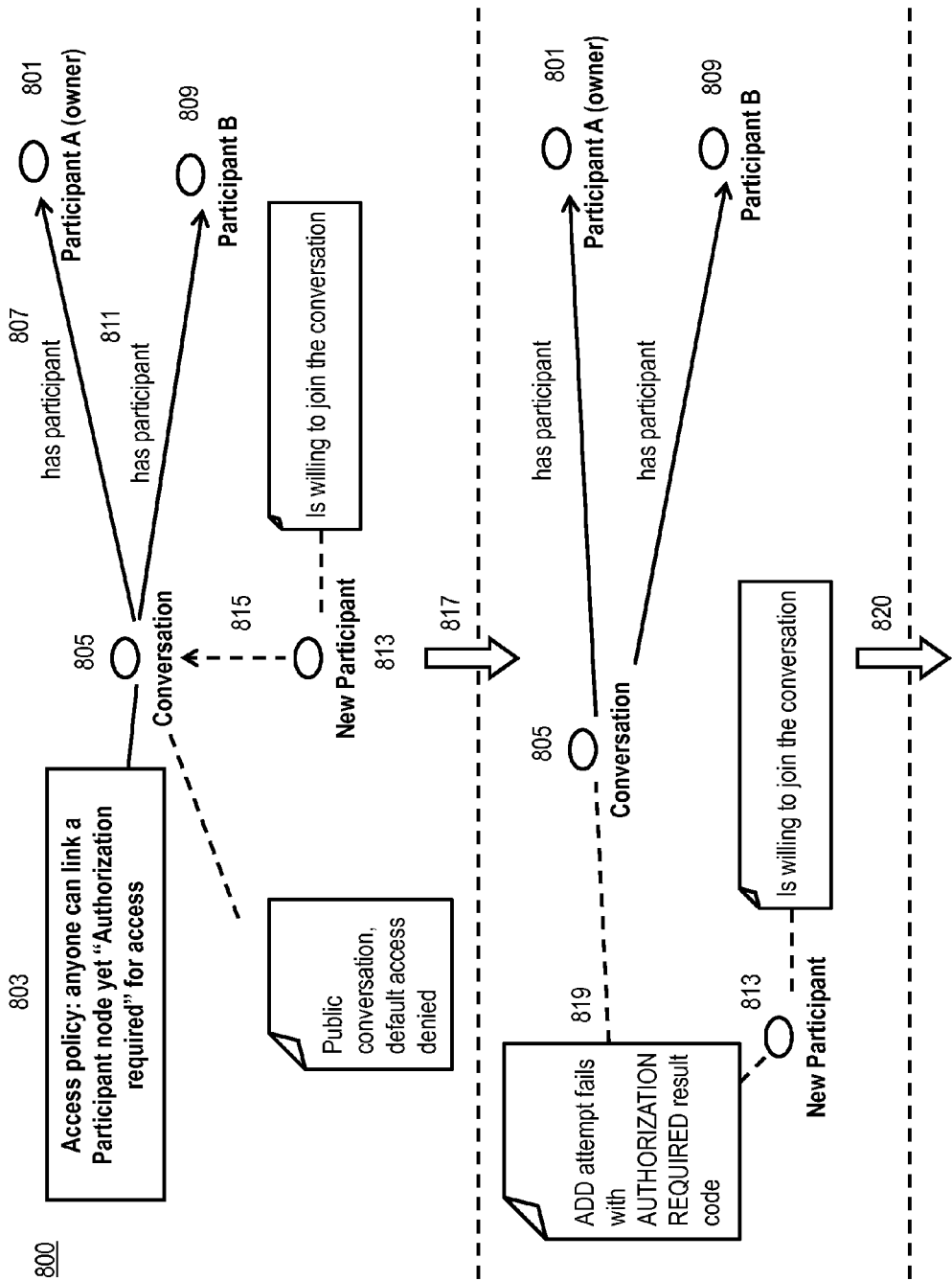
FIGS. 8A-8B are diagrams of a process of reactive authorization in the semantic environment, according to one embodiment.
Figure 8B:
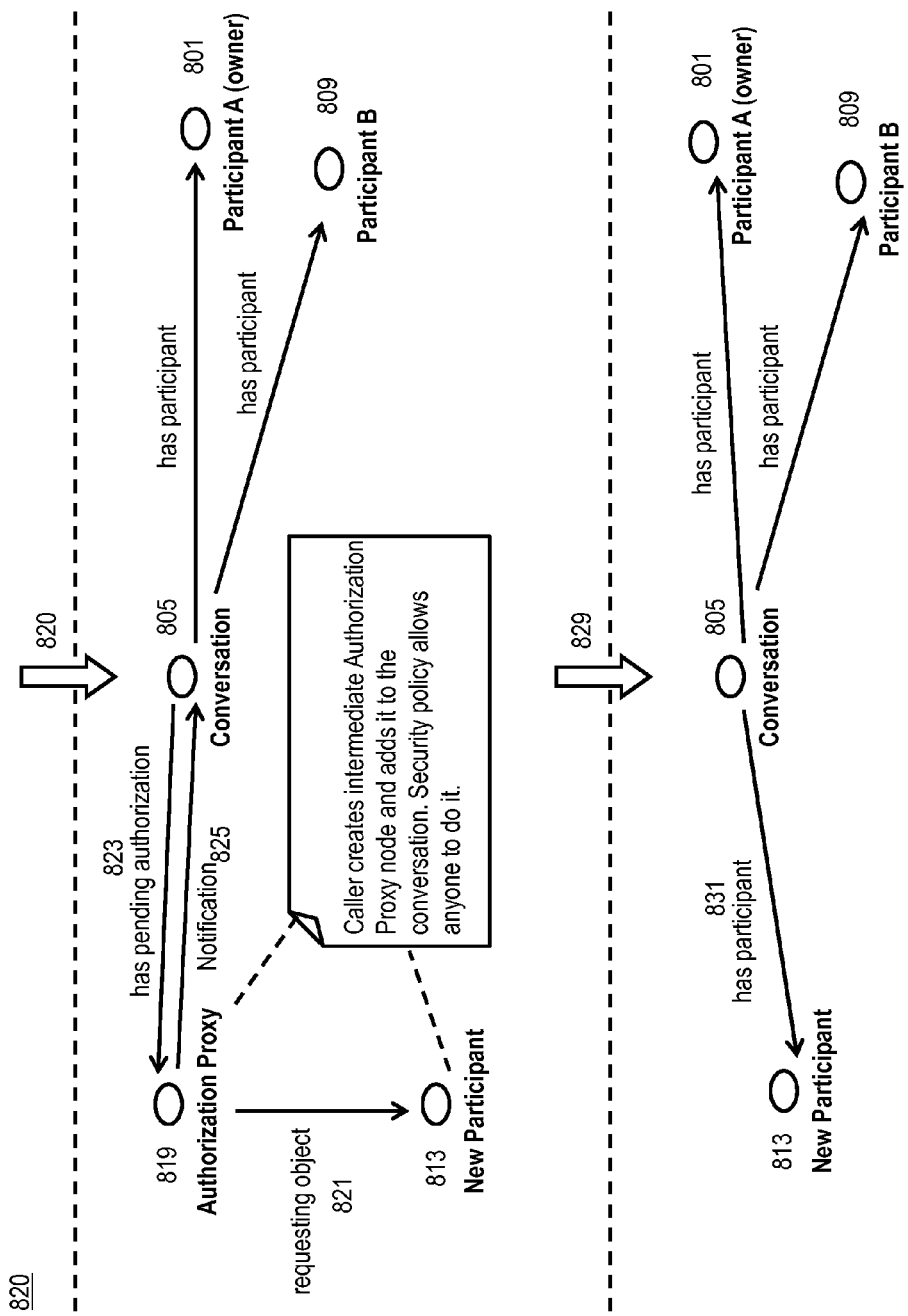

In other embodiments, as a result of AUTH_REQUIRED status code, the semantic database and/or the semantic data cloud generate the authorization proxy entity and establish the first and second links, when the owner entity accepts the request FIGS. 8A-8B are diagrams 800, 820 of a process of reactive authorization in the semantic environment, according to one embodiment. In this embodiment, a node 801, who is the owner (e.g., Bob) of a resource/node (e.g., a conversation 805, Bob's trip photos to Australia, etc.), defines an access policy 803 for other nodes to access the conversation 805. The access policy 503 is set as follows:

1. "Always allow" Participant A to link nodes, including nodes of a type "Participant," to the resource. By way of example, Bob is always allowed to link a Participant node to his trip photo data.

2. "By invitation only" by default for linking nodes of the type "Participant." By way of example, whether a new Participant node is linked to Bob's trip photo data will be decided by Bob.

3. "Always allow" by default any users to link to a node of the type "Authorization Proxy." By way of example, a user is always allowed to link to an Authorization Proxy node.

4. "Deny" for any other objects and any users.

In one embodiment, the process starts with a participant A (e.g., the owner) and a participant B. Their corresponding nodes 801, 809 respectively establish relationships/links 807, 811 with the conversation node 805 as "has participant." If a new participant (e.g., a hiker interesting in hiking in Australia) wants to join the conversation, the new participant's access application attempts to link its node 813 to the conversation node 805 by sending a request 815 (e.g., "ADD"). As shown after a process flow 817, the request 815 occurs after the links 807, 811, and is expressed in a broken line). The access application of the conversation node 805 then replies with a status code 819 (e.g., "AUTHORIZATION_REQUIRED") to the new node 813, based upon the reactive authorization policy.

As shown after a process flow 820 (continuing to FIG. 8B), the access application of the new Participant node 813 creates an instance of an Authorization Proxy node 819 and a "requesting object" link 821 from the new Participant node 813 to the Authorization Proxy node 819. The "Authorization Proxy" node 819 is then linked to the conversation node 805 with a status 823 of "has pending authorization." The data access policy of the conversation node 805 allows linking of the Authorization Proxy node 819 to the conversation node 805. This node 819 allows linking of any other nodes to it using the relationship called "requesting object". Any node of a type of "Participant" can link to the conversation node 805 to establish a relationship/link with the conversation node via the Authorization Proxy node 819. The link 821 is created before establishing the link 823, such that when the owner node 805 "sees" (i.e., detects) a new object, the new graph including the Authorization Proxy node 819 is complete. As a result of its own event subscription, the access application of the Participant A node 801 receives a notification 825 regarding the appearance of the new Authorization Proxy node 819 linked to the conversation node 805. This is interpreted as an authorization request from the new node 813.

Prior to linking the Authorization Proxy node 819 to the conversation node 805 via the link 823, the requesting application of the owner node 801 sets up an event subscription for changes affecting the Authorization Proxy node 819 in order to receive a notification about the changes including an outcome of the object request 821. After detecting the Authorization Proxy node 819 and the new Participant node 813 via the event subscription, the access application of the owner node 801 sends a query to the owner node 801 to find out whether to accept the new Participant node 813. To make that decision, the owner node 801 finds information of the new Participant node via the links 821, 823.

By checking the graph of the new node 813, the access application of the owner node 801 discovers who is requesting the authorization (e.g., the new participant). The participant A reaches to the new Participant node 813 to read the RDF thereof. The RDF contains all personal information of the new participant, such as name, age, sex, phone number, bank account, personal contacts, emails, etc. The smart space allows each node to divide a personal smart space into subspaces to be accessible for different purposes. As results, the new Participant node 813 defines as much as information is accessible for participating in the conversation.

Thus, the access application of the owner node 801 presents the required UI element(s) via the application layer and the presentation layer to the participant A for permission or denial of the new participant. The process can remain in this state as long as the owner needs (e.g., to check out the background of the new participant, to run errands, etc.), since nothing is blocked by the decision process. In another embodiment, a timeout (e.g., after X hours) is implemented to remove of the new Participant node 813 and the Authorization Proxy node 819 from the conversation node, to conserve resources. This can be achieved by a generic mechanism of implementing a limited time-to-live for the nodes 813, 819.

Eventually, as shown after a process flow 829, the owner (Participant A) decides to approve the request. The access application of the node 801 links the new Participant node 813 to the conversation node 805 using a "has participant" relationship/link 831, and then removes/unlinks the Authorization Proxy node. This is allowed by the reactive access policy due to the actions of the owner node 801 because the actions are performed by the owner node 801 itself. The new Participant node 813 detects the change via the subscription mechanism and realizes that he/she obtains access to the conversation.

When the request is denied, the access application of the node 801 deletes the Authorization Proxy node 819 and drops the link 823 between the Authorization Proxy node 819 and the conversation node 805. In another embodiment, the access application of the node 801 drops the link 823 and leaves to the new Participant node 819 to delete the Authorization Proxy node 819. The new Participant node 819 interprets either scenario as indication that the access is denied.

Since the new Participant node accesses the conversation node 805 depending upon the owner's approval, the conversation node 805 is open to the public yet reactive authorization is required. For example, Bob allows strangers to access a subgraph of his personal RDF graph including his Australian trip photos by invitation. Other resource examples include a construction bidding description, a wedding gift wish list, a class reunion database, etc.

In another embodiment, rather than having the access application of the new participant node 813 create the instance of Authorization Proxy (or reuse existing one if available) in response to the notification of the status code AUTHORIZATION_REQUESTED, the access application of the conversation node 805, or the semantic database, or the semantic data cloud creates the Authorization Proxy node 819 and the links 821 and 823, in response to an ADD request 815 from the new Participant node 813. This is a generic operation, and the relevant Authorization Proxy node type is a generic as well (i.e., not specific to the new participant node 813).

Figure 9A:
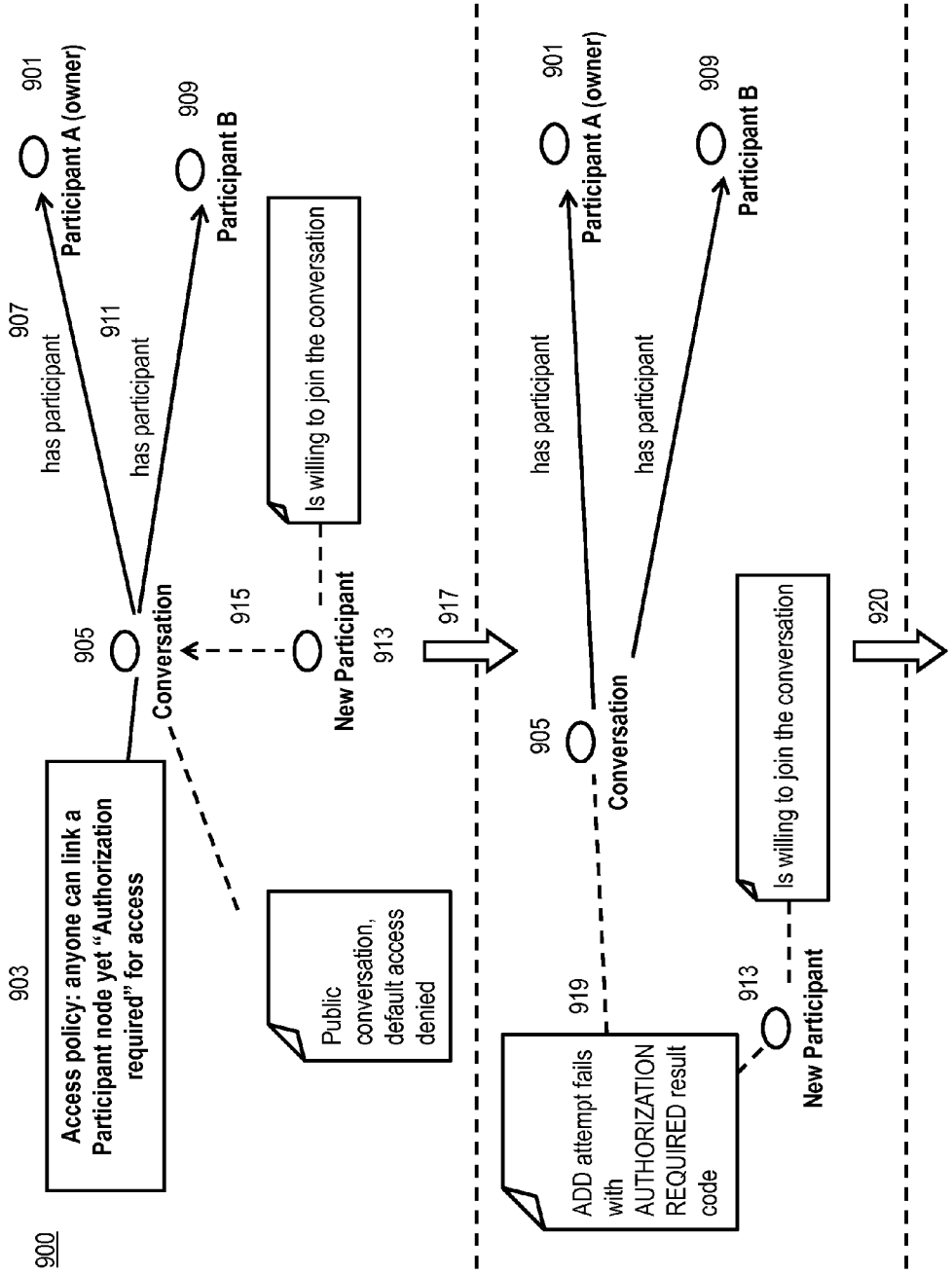
FIGS. 9A-9B are diagrams of a process of reactive authorization in the semantic environment, according to one embodiment.
Figure 9B:
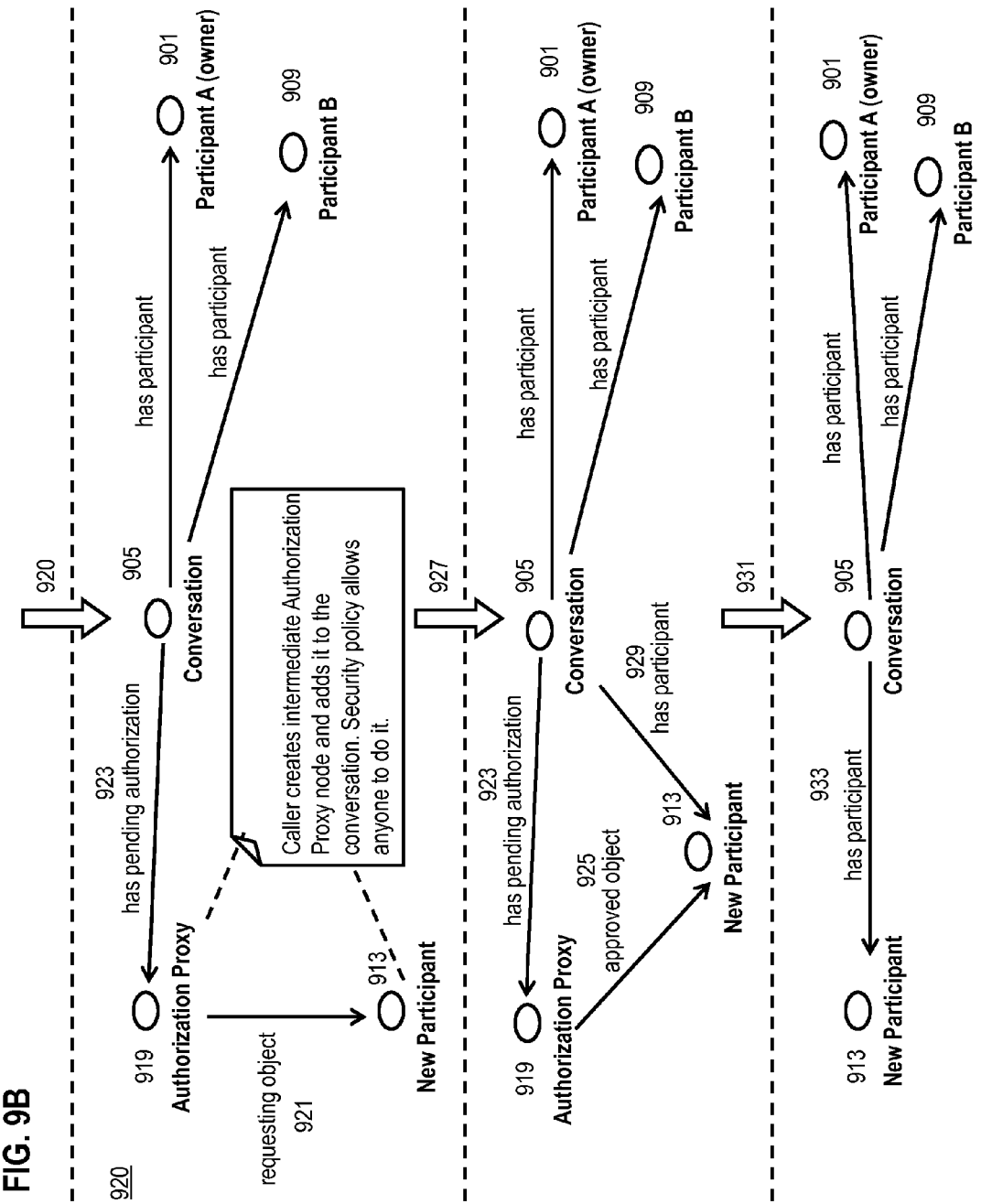

In yet another embodiment, instead of automatically removing/unlinking the Authorization Proxy node upon successful authorization, Participant A changes the type of relationship from the Authorization Proxy node to a new Participant node from "requesting object" (FIG. 8B) to "approved object" (FIG. 9B), and then links the new Participant node to the conversation node. This makes the access application of the new Participant node responsible for deleting the Authorization Proxy node. FIGS. 9A-9B are diagrams 900, 920 of a process of reactive authorization in the semantic environment, according to one embodiment.

The conversation starts with a participant A (e.g., the owner) and a participant B. Their corresponding nodes 901, 909 respectively establish relationships/links 907, 911 with the conversation node 905 as "has participant." If a new participant wants to join the conversation, its application attempts to link its node 913 to the conversation node 905. The application of the new participant sends a request 915 (e.g., "ADD") to link the participant node 913 to the conversation node 905. As shown after a process flow 917, the conversation node 905 then replies with a status code 919 (e.g., "AUTHORIZATION_REQUIRED") to the new node 913, according to an access policy 903 which is the same as the access policy 803 in FIG. 8A.

As shown after a process flow 920 (continuing to FIG. 9B), the access application of the participant node 913 creates an instance of node type Authorization Proxy 919 linked to conversation node 905 with a link of "requesting object" 921 and a status 923 of "has pending authorization." Eventually, as shown after a process flow 927, the owner (Participant A) decides to approve the request. The access application of the Participant A changes the type of relationship from the Authorization Proxy node to a new Participant node from "requesting object" 921 to "approved object" 925, and then links the new Participant node 913 to the conversation node 905. As shown after a process flow 931, the access application of the node 901 then links the new Participant node 913 to the conversation node 905 using a "has participant" relationship/link 933. The access application of the new Participant node 913 then deletes the Authorization Proxy node 919.

In yet another embodiment, the access application of the owner node 901 takes care of the clean-up of the Authorization Proxy node 919, if it is responsible for its transparent creation, etc.

The above-described embodiments perform application-specific interactive operations using generic data manipulation mechanisms offered by the smart space. Any application can use the approach of reactive authorization without implementing advance protocols and access applications at the data layer.

The above-described embodiments support implementing security policies with owner intervention/authorization. The above-described embodiments allow switching from proactive to reactive authorization for a particular object by just changing its policy when the applications are ready for it.

The above-described embodiments allow a lot of flexibility. For example, several users (extending their prior relationships) act as authorities for the owner, e.g., any of them would be able to approve the access request. The authority can be further delegated from one user (other than the owner) to another user.

The above-described embodiments require only one new node type Authorization Proxy and predefined types of the relationships (e.g., "has participant," "has pending authorization," "requesting object," and "approved object") to execute reactive authorization. The above-described embodiments do not require creating application-specific or use-case-specific data types to handle each of different use cases separately as in the hypertext internet interoperability architecture.

The processes described herein for providing reactive authorization for accessing a semantic network resource may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
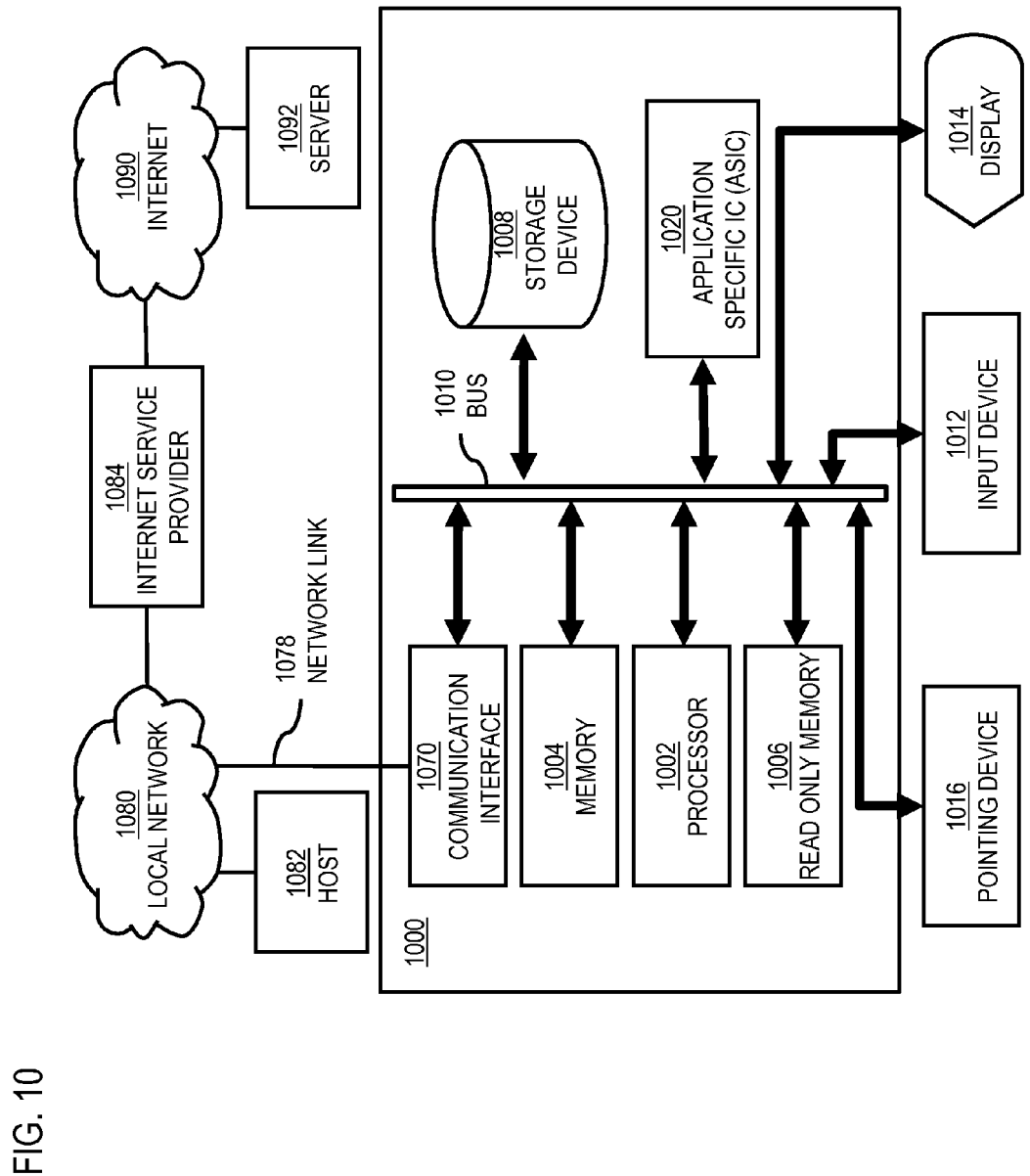
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) or provide reactive authorization for accessing a semantic network resource as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing reactive authorization for accessing a semantic network resource.

In this context, a protocol includes a set of rules defining how the network nodes within the communication network interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related or provide reactive authorization for accessing a semantic network resource. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing reactive authorization for accessing a semantic network resource. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing reactive authorization for accessing a semantic network resource, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection from a user terminal to the communication network.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide reactive authorization for accessing a semantic network resource as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of services. Chip set or chip 1100, or a portion thereof, constitutes a means for performing one or more steps of providing reactive authorization for accessing a semantic network resource.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide reactive authorization for accessing a semantic network resource. The memory 1105 also stores the data associated with or generated by the execution of the inventive steps.

Figure 12:
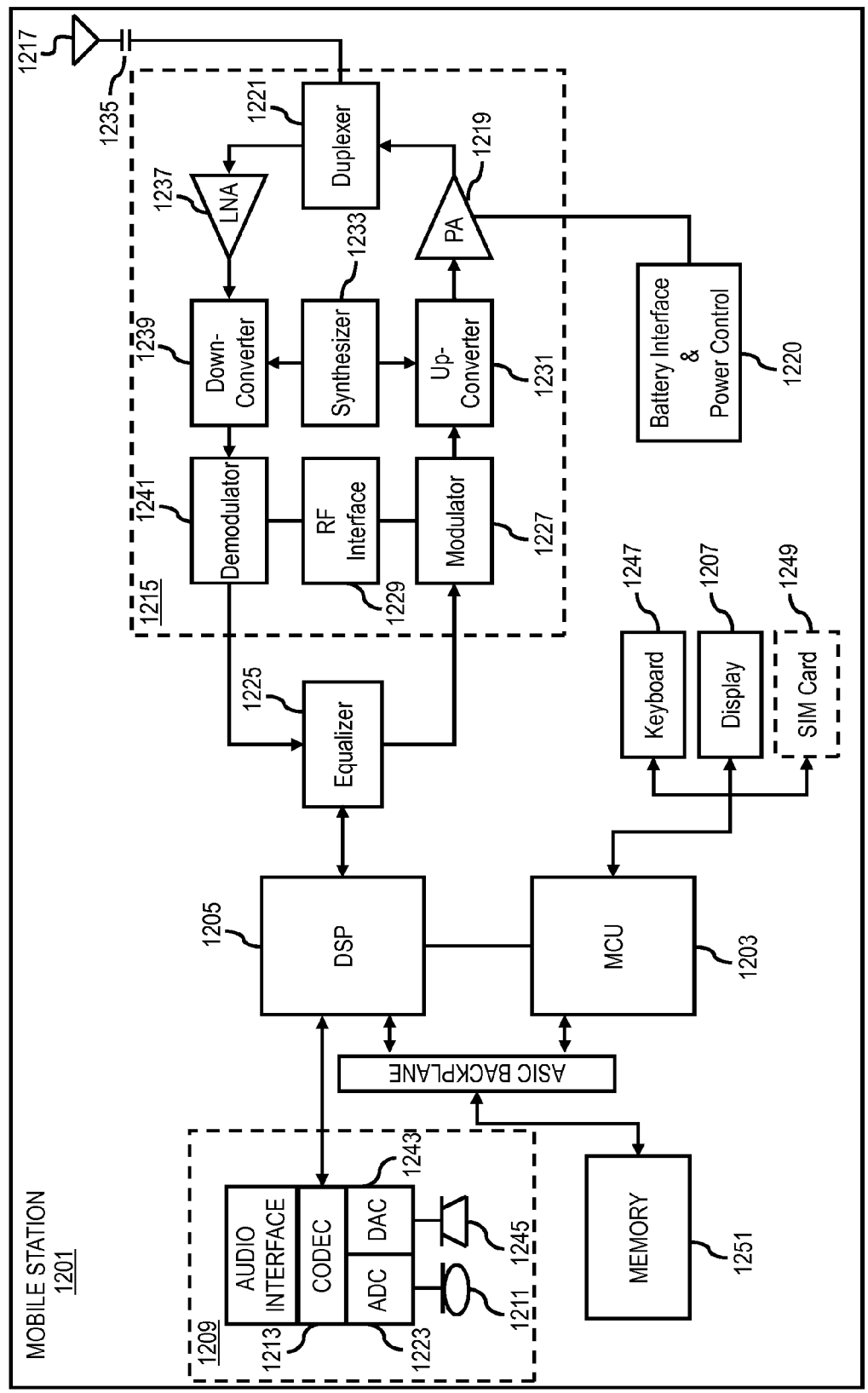
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1200, or a portion thereof, constitutes a means for performing one or more steps of providing reactive authorization for accessing a semantic network resource. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing reactive authorization for accessing a semantic network resource. The display 12 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide reactive authorization for accessing a semantic network resource. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   detecting, via a processor, an authorization proxy entity acting between at least a semantic network resource and a requesting entity that requests access to the semantic network resource, wherein the authorization proxy entity has an access policy that determines a right to access the authorization proxy entity; and
   determining, via the processor, to cause, at least in part, actions that result in transmission of a query for whether to accept the requesting entity to an owner entity of the semantic network resource,
   wherein an access application of the requesting entity creates the authorization proxy entity after the request is issued, and
   wherein the authorization proxy entity is deleted by an access application of the owner entity of the semantic network resource after the request of the requesting entity is authorized or denied.

2. The method of claim 1, further comprising:
   determining to cause actions that result in establishing a link between at least the requesting entity and the semantic network resource, when the owner entity accepts the requesting entity, or
   determining to cause actions that result in dropping a link between the authorization proxy entity and the semantic network resource, when the owner entity denies the requesting entity.

3. The method of claim 1, further comprising:
   dropping a link between the authorization proxy entity and the semantic network resource after a predetermined time has passed since the transmission of the query.

4. The method of claim 1, further comprising:
   retrieving semantic information of the requesting entity; and
   determining to cause actions that result in presentation of the semantic information to the owner entity.

5. The method of claim 2, wherein the authorization proxy entity is created according to a reactive access policy set by the owner entity for accessing the semantic network resource, and the determinations are made at least in part based upon the reactive access policy.

6. The method of claim 1, wherein each of the query and the semantic network resource are represented by a semantic graph.

7. The method of claim 1, wherein the access to the semantic network resource includes creating an account, registering an account, posting a new message to a blog, posting a new message to a discussion forum, subscribing to a query, or a combination thereof.

8. A method comprising:
   causing, at least in part, via a processor, transmission of a request for accessing a semantic network resource;
   causing, at least in part, via the processor, generation of an authorization proxy entity by an access application of the requesting entity after the request is issued, wherein the authorization proxy entity has an access policy that determines a right to access the authorization proxy entity; and
   causing, at least in part, via the processor, reception of a notification regarding authorization by an owner entity of the semantic network resource,
   wherein the authorization proxy entity is deleted by an access application of the owner entity of the semantic network resource after the request of the requesting entity is authorized or denied.

9. The method of claim 8, further comprising:
   establishing one or more links between the requesting entity and the semantic network resource through the authorization proxy entity.

10. The method of claim 9, further comprising:
    detecting a direct link to the semantic network resource and accessing the semantic network resource through the direct link, when the owner entity accepts the request; or
    dropping the one or more links between the requesting entity and the semantic network resource through the authorization proxy entity, when the owner entity denies the request.

11. An apparatus comprising:
    at least one processor; and
    at least one memory including computer program code for one or more programs,
    the at least one memory and the computer program code configured to, with the at least one processor, cause the apparatus to perform at least the following,
        detect an authorization proxy entity acting between at least a semantic network resource and a requesting entity that requests access to the semantic network resource, wherein the authorization proxy entity has an access policy that determines a right to access the authorization proxy entity; and
        determine to cause, at least in part, actions that result in transmission of a query for whether to accept the requesting entity to an owner entity of the semantic network resource,
        wherein an access application of the requesting entity creates the authorization proxy entity after the request is issued, and
    wherein the authorization proxy entity is deleted by an access application of the owner entity of the semantic network resource after the request of the requesting entity is authorized or denied.

12. The apparatus of claim 11, wherein the apparatus is further caused to:
    determine to cause actions that result in establishing a link between at least the requesting entity and the semantic network resource, when the owner entity accepts the requesting entity, or
    determine to cause actions that result in dropping a link between the authorization proxy entity and the semantic network resource, when the owner entity denies the requesting entity.

13. The apparatus of claim 11, wherein the apparatus is further caused to:
    drop a link between the authorization proxy entity and the semantic network resource after a predetermined time has passed since the transmission of the query.

14. The apparatus of claim 11, wherein the apparatus is further caused to:
    retrieve semantic information of the requesting entity; and
    determine to cause actions that result in presentation of the semantic information to the owner entity.

15. The apparatus of claim 12, wherein the authorization proxy entity is created according to a reactive access policy set by the owner entity for accessing the semantic network resource, and the determinations are made at least in part based upon the reactive access policy.

16. The apparatus of claim 11, wherein each of the query and the semantic network resource are represented by a semantic graph.

17. The apparatus of claim 11, wherein the access to the semantic network resource include creating an account, registering an account, posting a new message to a blog, posting a new message to a discussion forum, subscribing to a query, or a combination thereof.

18. An apparatus comprising:
 at least one processor; and
 at least one memory including computer program code for one or more programs,
 the at least one memory and the computer program code configured to, with the at least one processor, cause the apparatus to perform at least the following,
  cause, at least in part, transmission of a request for accessing a semantic network resource;
  cause, at least in part, generation of an authorization proxy entity by an access application of the requesting entity after the request is issued, wherein the authorization proxy entity has an access policy that determines a right to access the authorization proxy entity; and
  cause, at least in part, reception of a notification regarding authorization by an owner entity of the semantic network resource,
  wherein the authorization proxy entity is deleted by an access application of the owner entity of the semantic network resource after the request of the requesting entity is authorized or denied.

19. The apparatus of claim 18, wherein the apparatus is further caused to:
 establish one or more links between the requesting entity and the semantic network resource through the authorization proxy entity.

20. The apparatus of claim 19, wherein the apparatus is further caused to:
 detect a direct link to the semantic network resource and accessing the semantic network resource through the direct link, when the owner entity accepts the request; or
 drop the one or more links between the requesting entity and the semantic network resource through the authorization proxy entity, when the owner entity denies the request.

* * * * *